US012365182B2

(12) United States Patent
Iida

(10) Patent No.: US 12,365,182 B2
(45) Date of Patent: Jul. 22, 2025

(54) IMAGE RECORDING APPARATUS AND METHOD OF CONTROLLING THE SAME

(71) Applicant: BROTHER KOGYO KABUSHIKI KAISHA, Nagoya (JP)

(72) Inventor: Shotaro Iida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 210 days.

(21) Appl. No.: 18/350,298

(22) Filed: Jul. 11, 2023

(65) Prior Publication Data

US 2024/0034068 A1 Feb. 1, 2024

(30) Foreign Application Priority Data

Jul. 29, 2022 (JP) ................................ 2022-121936

(51) Int. Cl.
*B41J 2/165* (2006.01)

(52) U.S. Cl.
CPC ....... *B41J 2/16541* (2013.01); *B41J 2/16552* (2013.01); *B41J 2002/16558* (2013.01)

(58) Field of Classification Search
CPC ................ B41J 2/16541; B41J 2/16552; B41J 2002/16558
See application file for complete search history.

(56) References Cited

U.S. PATENT DOCUMENTS

2008/0259117 A1 10/2008 Takada
2016/0031222 A1 2/2016 Kobayashi
2017/0100937 A1* 4/2017 Ohnishi ............... B41J 2/16552
2021/0206170 A1 7/2021 Kobayashi et al.
2023/0150266 A1* 5/2023 Iida ...................... B41J 2/04503 347/22

FOREIGN PATENT DOCUMENTS

JP 2013-60018 A 4/2013
JP 2022157650 A * 10/2022 .......... B41J 2/16535
JP 7260057 B2 * 4/2023 ............ B41J 2/1652

OTHER PUBLICATIONS

An extended European Search Report dated Dec. 11, 2023 from related EP 23 18 3678.4.

* cited by examiner

*Primary Examiner* — Sharon Polk
(74) *Attorney, Agent, or Firm* — Scully, Scott, Murphy & Presser, PC

(57) ABSTRACT

There is provided an image recording apparatus including: a head; a maintenance unit; and a controller. The maintenance unit includes a wiper tank and a flushing tank. A first tank is one of the wiper and flushing tanks and a second tank is remaining one of the wiper and flushing tanks. The controller is configured to perform a first processing of cleaning the first tank, under a condition that an elapsed time is less than a threshold value, the elapsed time being a time elapsed since cleaning of the second tank or since a predetermined processing performed first after the cleaning of the second tank, and is configured to perform a second processing of cleaning the second tank by adding the cleaning liquid to the first tank, under a condition that the elapsed time is not less than the threshold value.

10 Claims, 11 Drawing Sheets

IMAGE RECORDING APPARATUS AND METHOD OF CONTROLLING THE SAME

REFERENCE TO RELATED APPLICATIONS

This application claims priority from Japanese Patent Application No. 2022-121936 filed on Jul. 29, 2022. The entire content of the priority application is incorporated herein by reference.

BACKGROUND ART

There is a known image recording apparatus which is provided with a head having nozzles configured to eject or discharge an ink. In order to prevent the nozzles from being clogged, the image recording apparatus performs a flushing processing of causing a nozzle surface of the head to face or to be opposite to a flushing foam accommodated in a flushing tank and of causing the ink to be ejected from the nozzles. The flushing foam is made, for example, of a porous material and absorbs the ink ejected from the nozzles of the head during the flushing processing.

Further, the image recording apparatus performs a wipe processing of wiping the nozzle surface with a wiper so as to remove any unwanted substance (unnecessary matter; the ink, any waste, debris, etc.) adhered to the nozzle surface of the head. As the wipe processing, a method of immersing the wiper in a wiper tank storing a cleaning liquid, causing the cleaning liquid to adhere to the nozzle surface with the wiper impregnated with the cleaning liquid, and wiping off the cleaning liquid and/or the unwanted matter adhered to the nozzle surface.

There exists a maintenance apparatus having an ink receiving chamber, a liquid injecting part and a waste liquid storing part. An absorbing member configured to absorb the ink jetted from the nozzles is positioned in the ink receiving chamber. The liquid injecting part injects a liquid (cleaning liquid) into the ink receiving chamber in a case that the head is away or separated from a location above the ink receiving chamber. The waste liquid storing part stores the ink and the liquid discharged (drained) from the ink receiving chamber. The absorbing member corresponds to the flushing foam, and the ink receiving chamber corresponds to the flushing tank.

DESCRIPTION

In a case that the ink absorbed by the flushing foam is left as it is, the ink dries inside the flushing foam, and the dried ink is fixed to the flushing foam. In view of this, such a configuration is considered that the cleaning liquid is supplied not only to the wiper tank but also to the flushing tank. In the image recording apparatus having this configuration, however, in a case that the supply of the cleaning liquid to the wiper tank and the supply of the liquid to the flushing tank are performed independently from each other, an amount of the cleaning liquid consumed in the wipe processing and an amount of the cleaning liquid consumed in the flushing processing become to be great.

The present disclosure has been made in view of the above-described circumstances, and an object of the present disclosure is to provide a means capable of reducing the amount of the cleaning liquid consumed in the wipe processing and in the flushing processing.

(1) According to an aspect of the present disclosure, there is provided an image recording apparatus including: a head having a nozzle configured to eject a liquid; a maintenance unit configured to perform maintenance of the head; and a controller. The maintenance unit includes: a wiper tank of which upper part is opened and which is configured to store a cleaning liquid; a wiper configured to move to a first position at which the wiper is capable of making contact with a nozzle surface of the head and to a second position at which the wiper is immersed in the cleaning liquid stored in the wiper tank; a flushing foam configured to absorb the liquid ejected from the nozzle; a flushing tank of which upper part is opened and which is configured to accommodate the flushing foam; a supply pump configured to supply the cleaning liquid to a first tank being one of the wiper tank and the flushing tank; and a discharge pump configured to discharge the cleaning liquid from the wiper tank and the flushing tank. The maintenance unit is configured such that the cleaning liquid is supplied, via the first tank, to a second tank being remaining one of the wiper tank and the flushing tank. In a case that the controller supplies the cleaning liquid to the first tank, the controller is configured to perform a first processing of cleaning the first tank, under a condition that an elapsed time is less than a first threshold value, the elapsed time being a time elapsed since cleaning of the second tank or since a first predetermined processing regarding the second tank performed first after the cleaning of the second tank, and the controller is configured to perform a second processing of cleaning the second tank by adding the cleaning liquid to the first tank, under a condition that the elapsed time is not less than the first threshold value.

According to the image recording apparatus as described above, in a case that the cleaning liquid is supplied to the first tank and that the time until next supplying of the cleaning liquid to the second tank is short, the adding of the cleaning liquid which has an effect of suppressing the ink from being fixed to the flushing foam in addition to an effect of lowering an evaporation rate of the cleaning liquid stored in the wiper tank is performed. By doing so, it is possible to reduce the amount of the cleaning liquid consumed in the wipe processing and in the flushing processing.

(2) The first tank may be the wiper tank; the second tank may be the flushing tank; and in a case that the controller supplies the cleaning liquid to the wiper tank, the controller may be configured to perform the first processing of cleaning the wiper tank, under a condition that an elapsed time elapsed since a first flushing processing performed first after the cleaning of the flushing tank is less than the first threshold value, and the controller may be configured to perform the second processing of cleaning the flushing tank by adding the cleaning liquid to the wiper tank, under a condition that the elapsed time is not less than the first threshold value.

(3) The wiper tank and the flushing tank may be adjacent to each other; the image recording apparatus may further include a partition partitioning the wiper tank and the flushing tank from each other; and the maintenance unit may be configured such that the cleaning liquid overflown from the first tank is supplied to the second tank over the partition.

(4) The controller may be configured to perform, as the first processing, a processing of controlling the discharge pump to discharge the cleaning liquid from the first tank and of controlling the supply pump to supply the cleaning liquid of a first amount to the first tank, the first amount being not less than a capacity of the first tank; and the controller may be configured to perform, as the second processing, a processing of controlling the discharge pump to discharge the cleaning liquid from the second tank and of supplying the cleaning liquid to the second tank by controlling the supply pump to supply the cleaning liquid of a second amount to the first tank, the second amount being an amount with which the cleaning liquid overflows from the first tank.

(5) The second amount may be not less than a sum of a vacant capacity of the first tank and an amount of the cleaning liquid to be supplied to the second tank.

(6) Under a condition that an evaporation rate of the cleaning liquid stored in the first tank is not less than a second threshold value, the controller may be configured to perform the first processing or the second processing based on the elapsed time; and under a condition that the evaporation rate is less than the second threshold value, the controller may be configured to perform a third processing of controlling the discharge pump to discharge the cleaning liquid from the second tank and of supplying the cleaning liquid to the second tank by controlling the supply pump to supply the cleaning liquid of a third amount to the first tank, the third amount being an amount with which the cleaning liquid overflows from the first tank and which is not more than the second amount.

(7) The third amount may be a sum of a vacant capacity of the first tank and an amount of the cleaning liquid to be supplied to the second tank.

(8) Under a condition that the evaporation rate is less than the second threshold value and that the elapsed time is not less than a third threshold value, the controller may be configured to perform the third processing.

(9) The third threshold value may be greater than the first threshold value.

(10) According to another aspect of the present disclosure, there is provided a method of controlling an image recording apparatus, the recording apparatus including: a head having a nozzle configured to eject a liquid; and a maintenance unit configured to perform maintenance of the head, the maintenance unit including: a wiper tank of which upper part is opened and which is configured to store a cleaning liquid; a wiper configured to move to a first position at which the wiper is capable of making contact with a nozzle surface of the head and to a second position at which the wiper is immersed in the cleaning liquid stored in the wiper tank; a flushing foam configured to absorb the liquid ejected from the nozzle; a flushing tank of which upper part is opened and which is configured to accommodate the flushing foam; a supply pump configured to supply the cleaning liquid to a first tank being one of the wiper tank and the flushing tank; and a discharge pump configured to discharge the cleaning liquid from the wiper tank and the flushing tank, the maintenance unit being configured such that the cleaning liquid is supplied, via the first tank, to a second tank being remaining one of the wiper tank and the flushing tank. The method comprising: performing a first processing step of cleaning the first tank, in a case of supplying the cleaning liquid to the first tank, under a condition that an elapsed time is less than a first threshold value, the elapsed time being a time elapsed since cleaning of the second tank or since a first predetermined processing regarding the second tank performed first after the cleaning of the second tank; and performing a second processing step of cleaning the second tank by adding the cleaning liquid to the first tank, in the case of supplying the cleaning liquid to the first tank, under a condition that the elapsed time is not less than the first threshold value.

According to the method of controlling the image recording apparatus as described above, it is possible to reduce the amount of the cleaning liquid consumed in the wipe processing and in the flushing processing, similarly to the image recording apparatus as described above.

According to the present disclosure, it is possible to reduce the amount of the cleaning liquid consumed in the wipe processing and in the flushing processing.

Figure 6A:
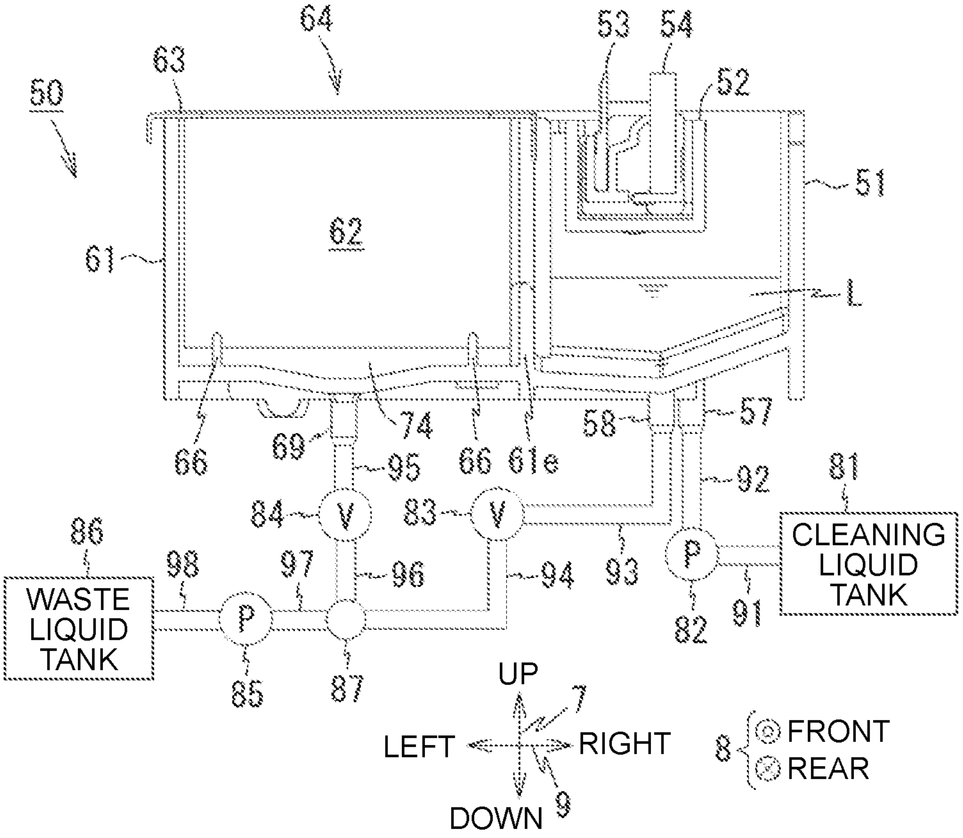
Figure 6B:
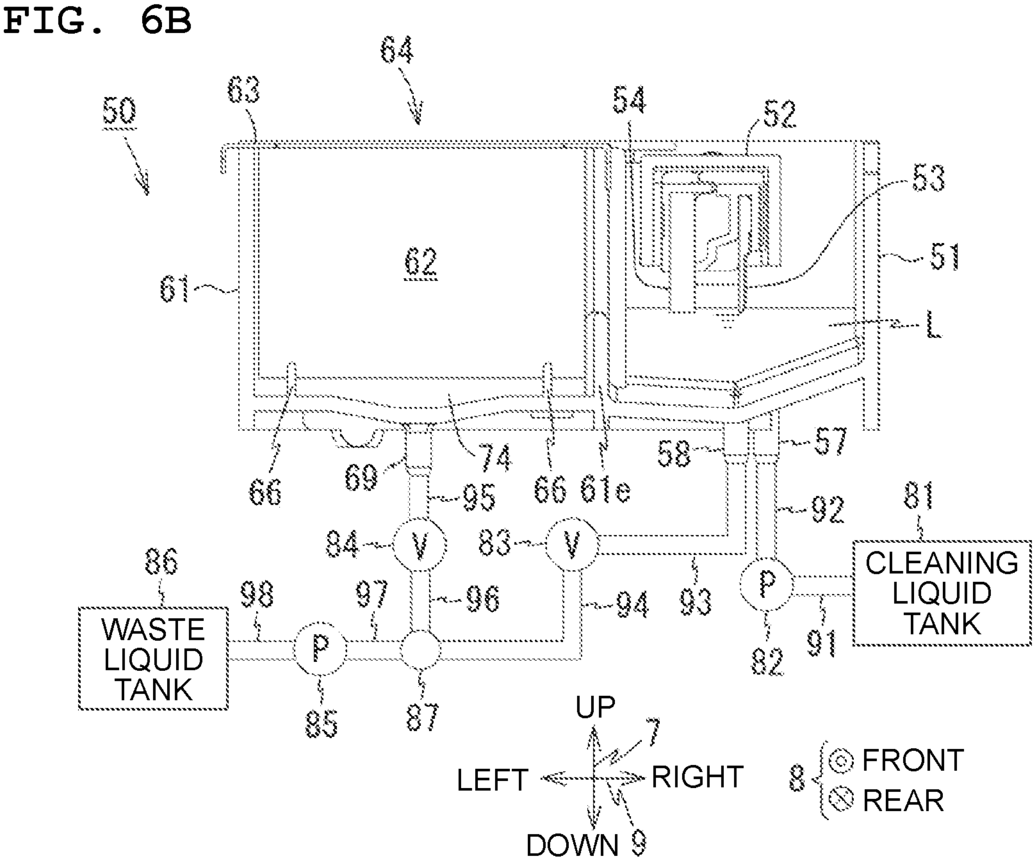

FIG. 6A is a view depicting the maintenance unit 50 in a case that a wiper unit 52 is positioned at an upward position, and FIG. 6B is a view depicting the maintenance unit 50 in a case that the wiper unit 52 is positioned at a downward position.

Figure 7:
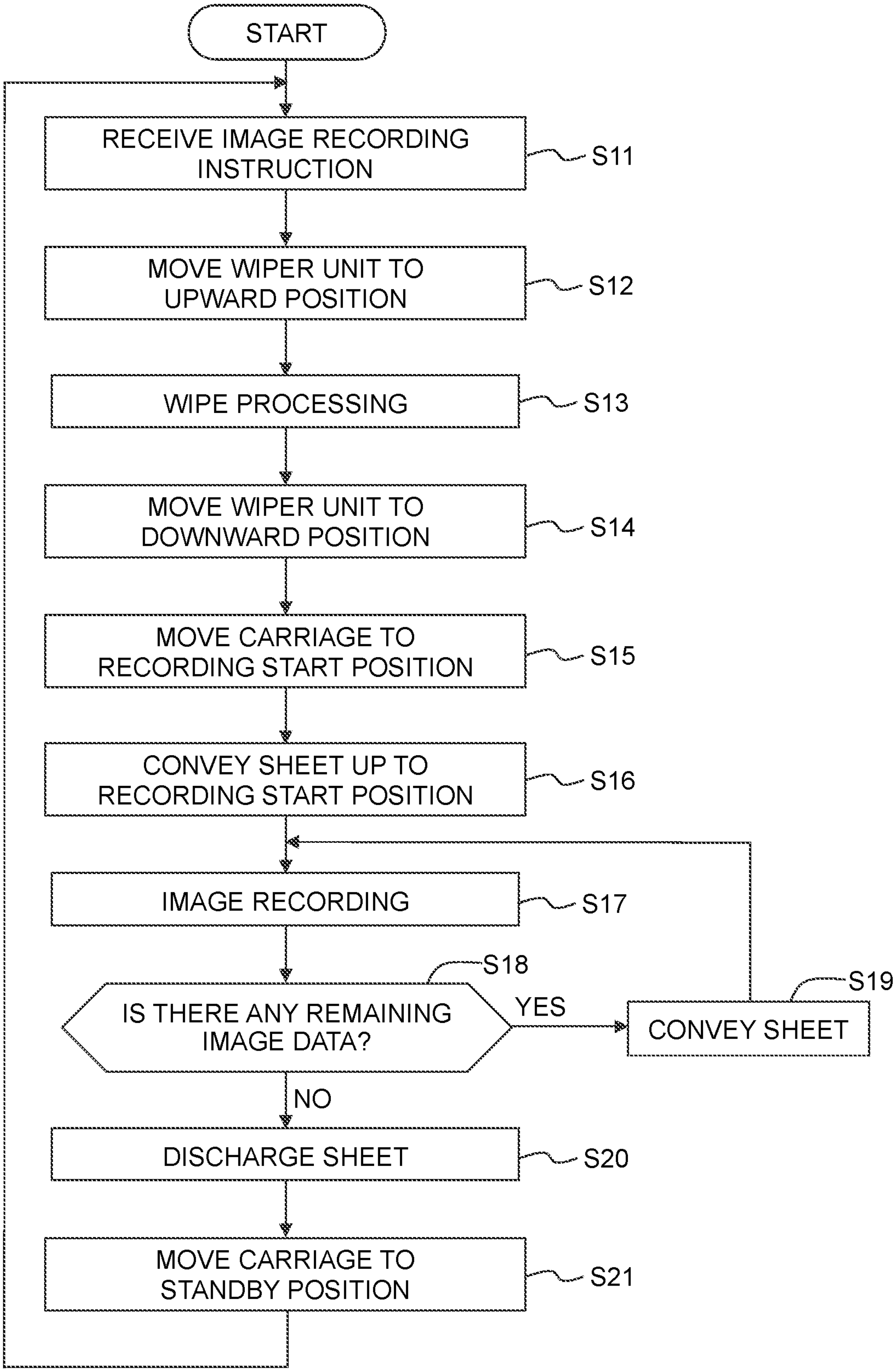

FIG. 7 is a flowchart indicating an image recording processing by the controller 100.

Figure 8:
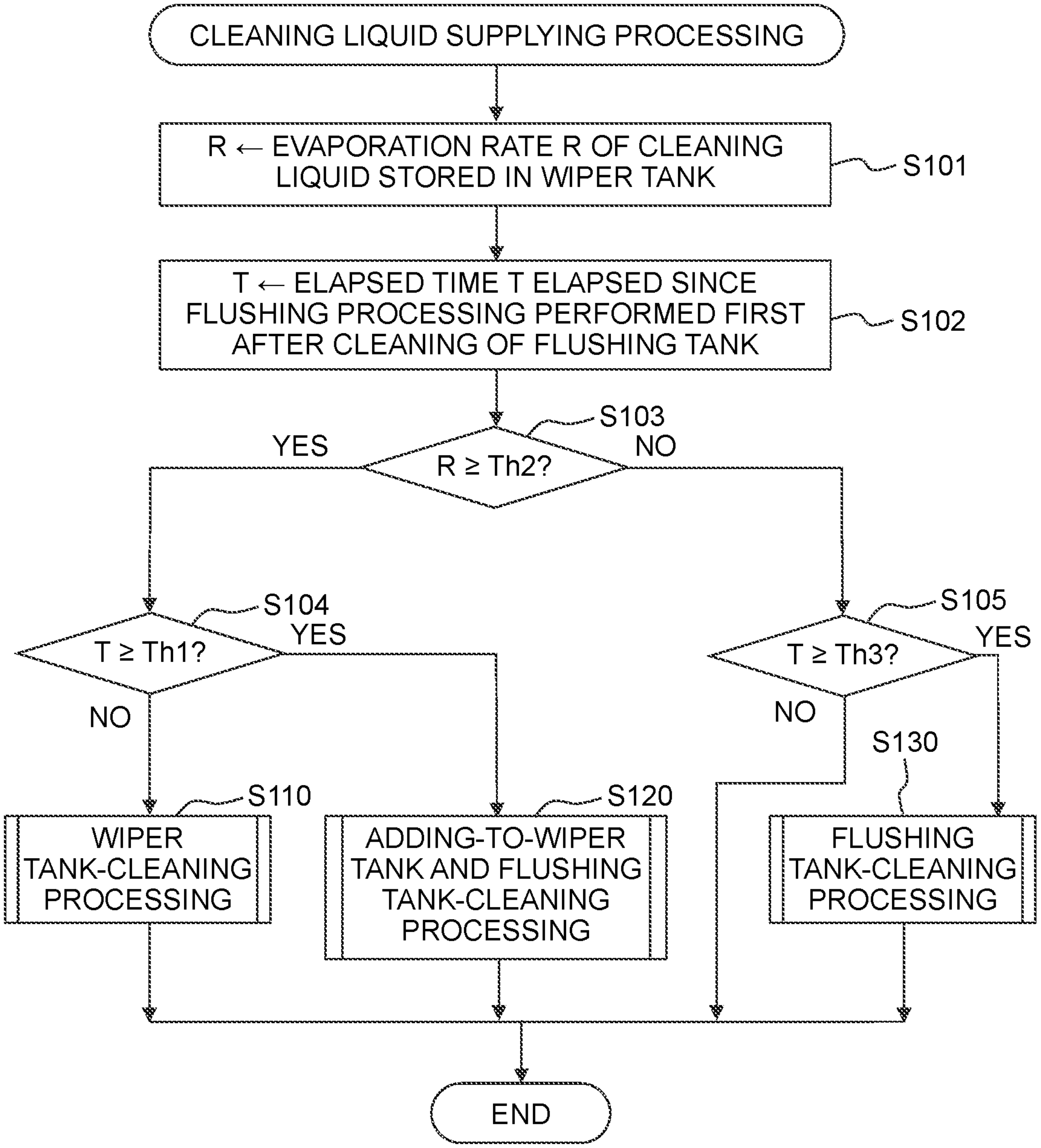

FIG. 8 is a flowchart indicating a cleaning liquid supplying processing by the controller 100.

Figure 9:
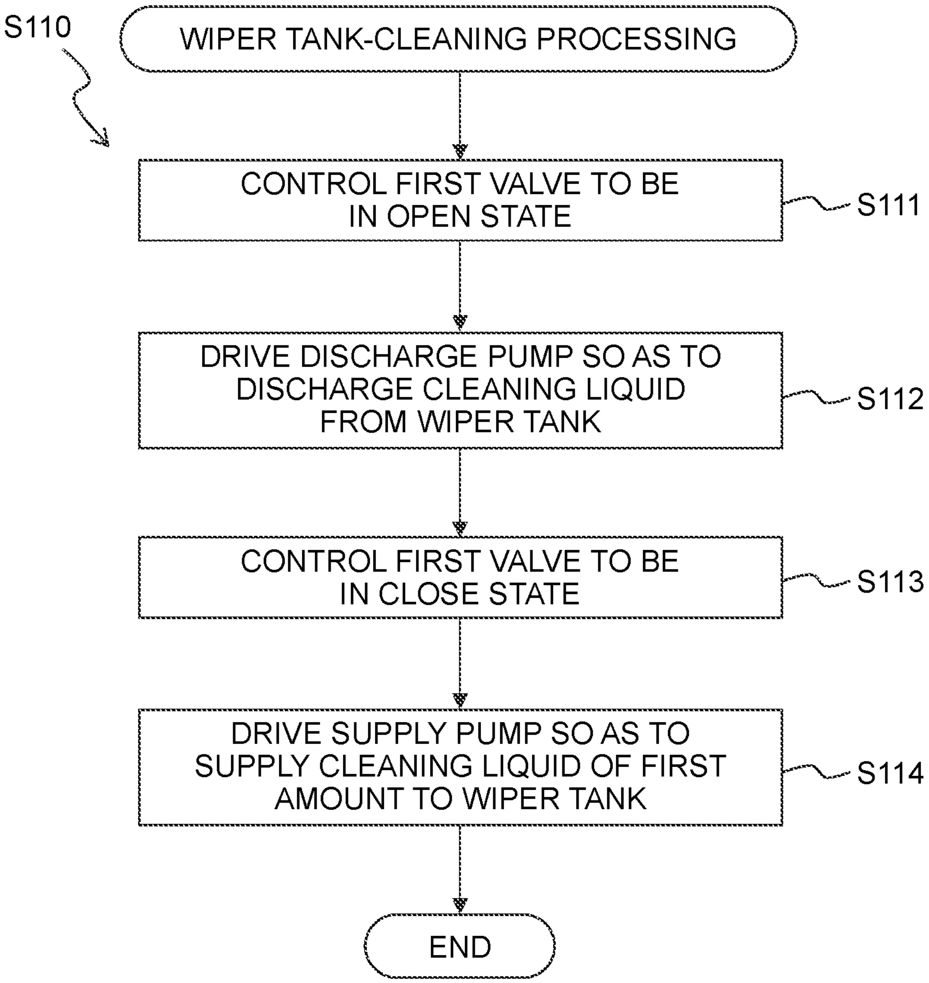

FIG. 9 is a flowchart indicating a wiper tank-cleaning processing by the controller 100.

Figure 10:
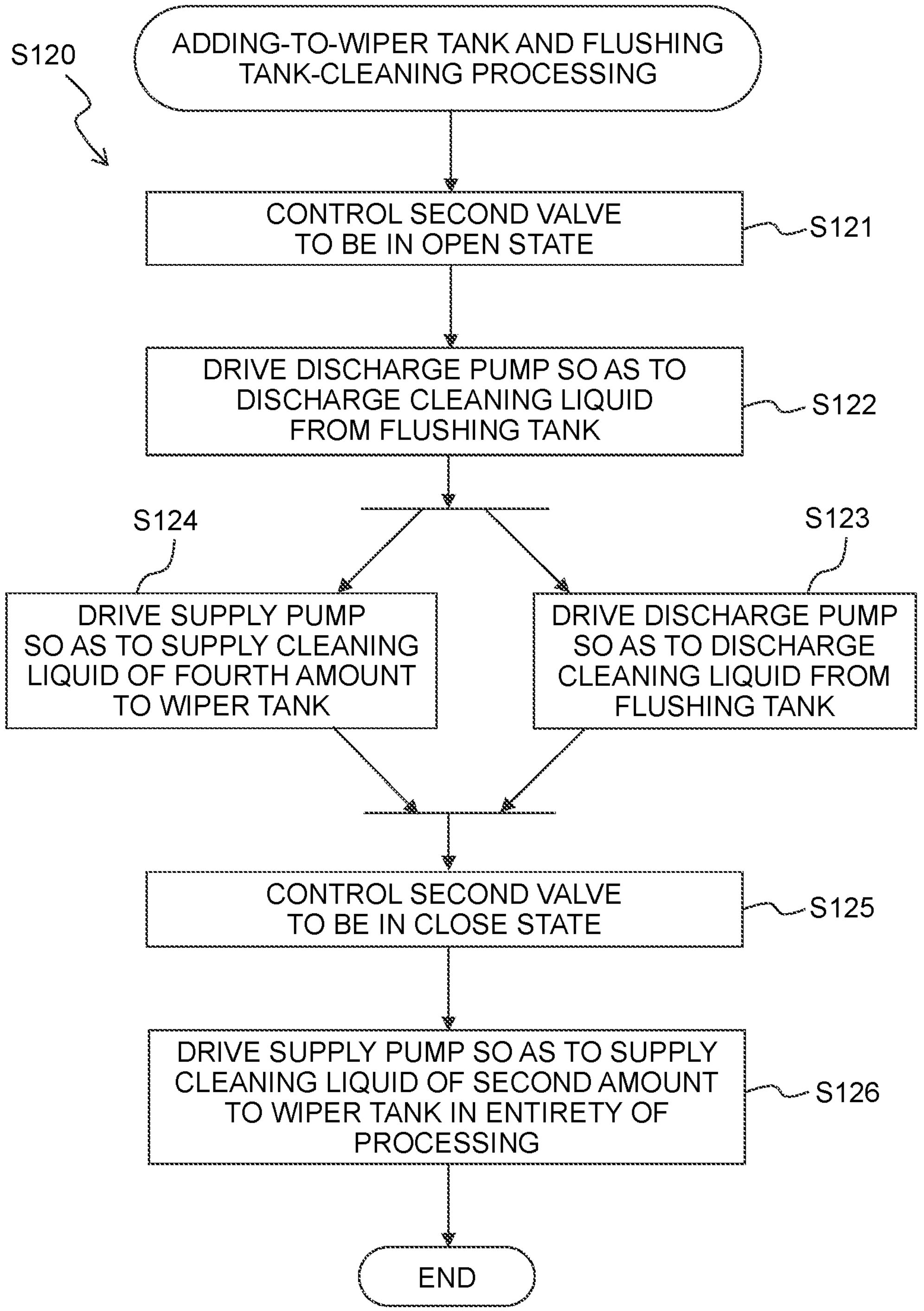

FIG. 10 is a flowchart indicating an adding-to-wiper tank and flushing tank-cleaning processing by the controller 100.

Figure 11:
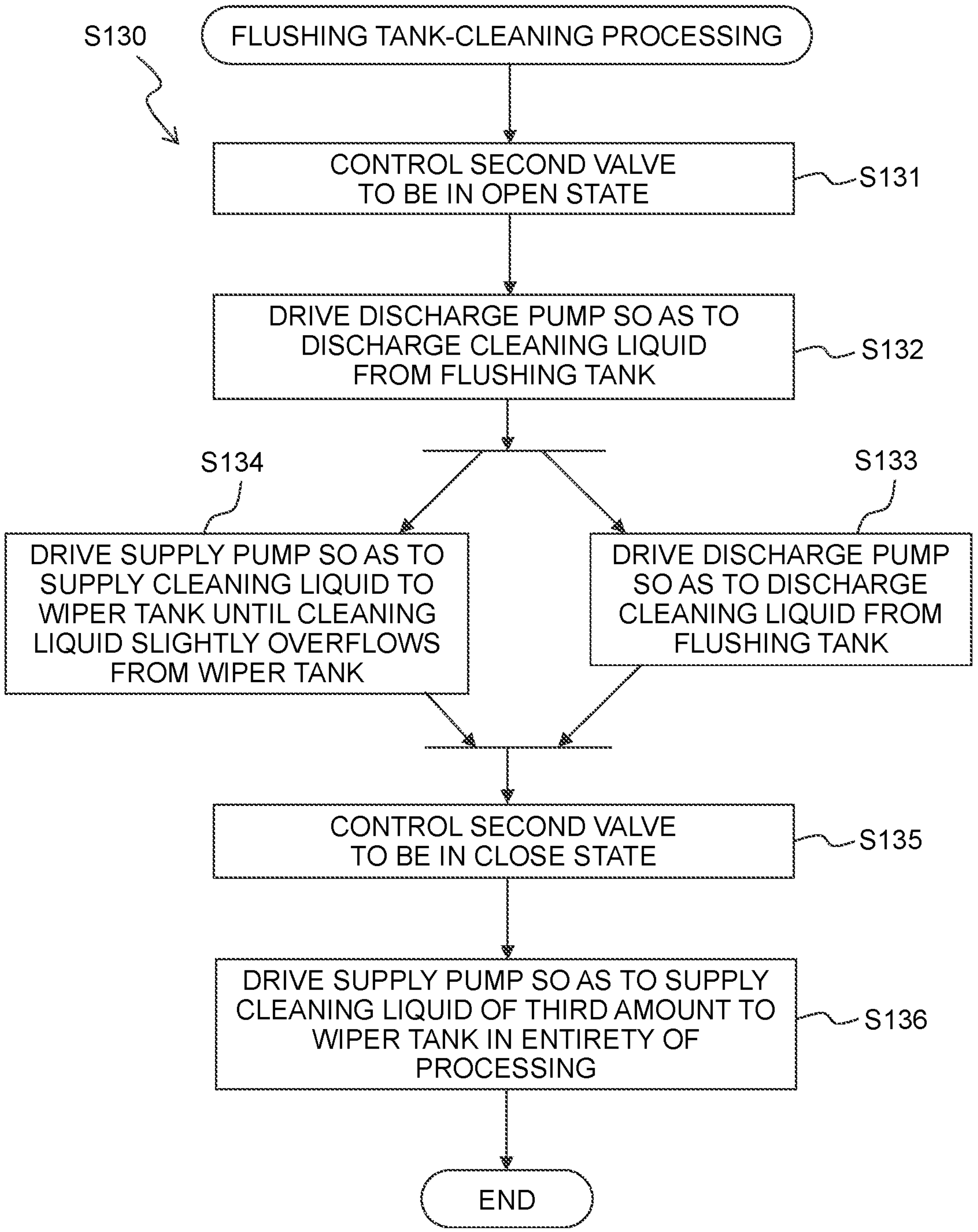

FIG. 11 is a flow chart of a flushing tank-cleaning processing.

A printer 10 (an example of an "image recording apparatus") according to an embodiment of the present disclosure will be explained below. It goes without saying that the embodiment described below is merely an example of the present disclosure and that the embodiment of the present disclosure can be changed as appropriate, in a range not changing the gist and spirit of the present disclosure. In the following explanation, advancement or movement (progress) directed from a starting point to an end point of an arrow is expressed as an "orientation", and going forth and back on a line connecting the starting point and the end point of the arrow is expressed as a "direction". Further, an up-down direction 7 is defined, with a state in which the printer 10 is installed usably (a state of FIG. 1), as the reference; a front-rear direction 8 is defined, with a side on which a discharge port 13 is provided is defined as a front side (front surface); and a left-right direction 9 is defined, with the printer 10 as seen from the front side (front surface). The up-down direction 7, the front-rear direction 8, and the left-right direction 9 are orthogonal to one another.

[Overall Configuration of Printer 10]

Figure 1:
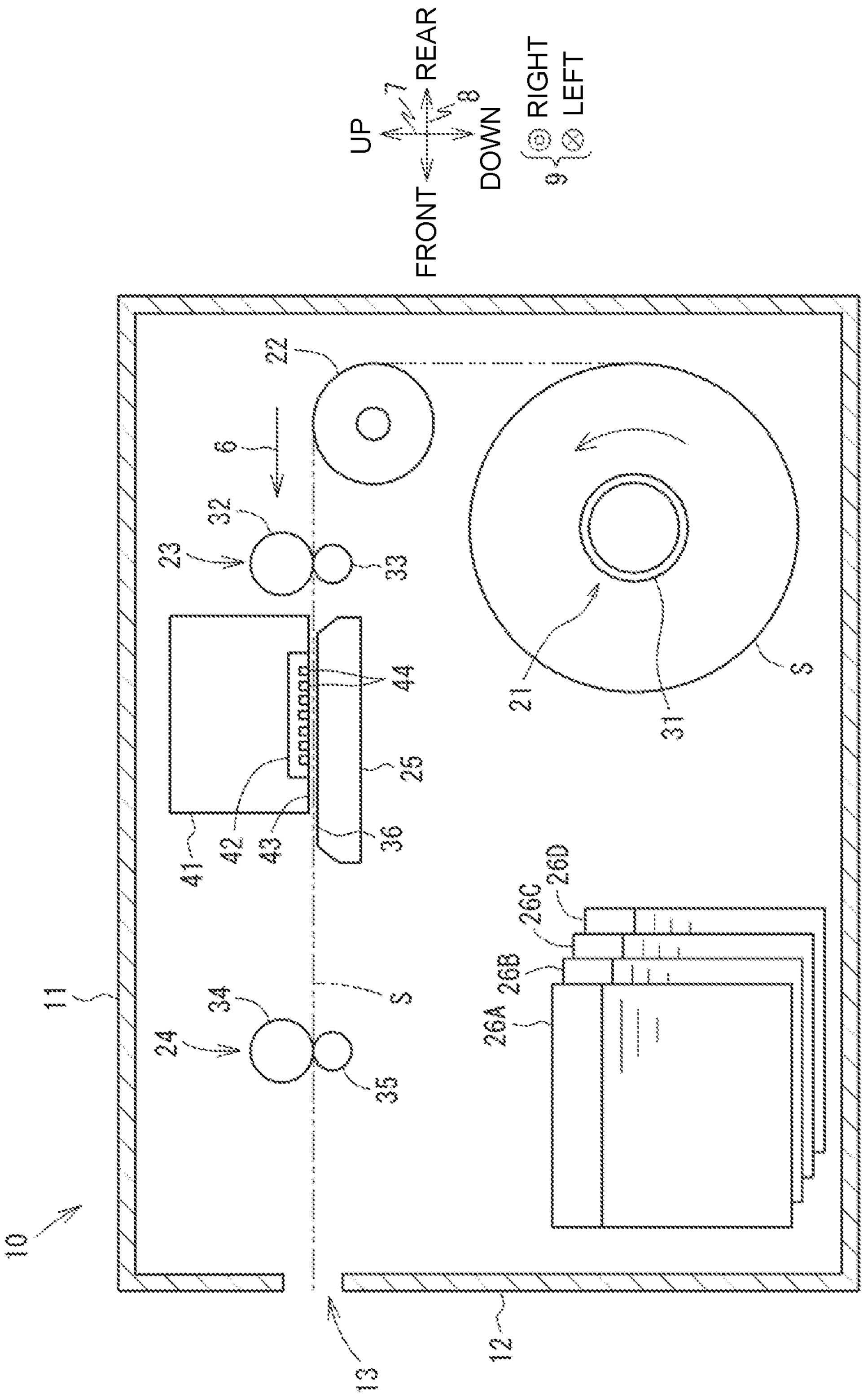
FIG. 1 is a schematic view depicting the internal configuration of a printer 10.

The printer 10 depicted in FIG. 1 is an image recording apparatus which records an image on a sheet S, as an example of a recording medium, by the ink-jet recording system. The sheet S is a long sheet (paper sheet or paper) wound in a roll shape. In order to install the sheet S in the printer 10, a through hole is formed in the winding center of the sheet S. The recording medium may be sticker sheet (sticker paper), fanfold paper, cut paper, or fabric, etc.

The printer 10 is provided with a substantially rectangular parallelopiped-shaped casing 11. The casing 11 has a size which is placeable on a table or desk, on the floor, or on a rack, etc. A discharge port 13 having a slit shape and extending in the left-right direction 9 is positioned in a front wall 12 of the casing 11. From the discharge port 13, a sheet Son which an image is recorded by the printer 10 is discharged. The discharged sheet S is wound up, for example, by a winding device (not depicted in the drawings) attached to the printer 10.

Figure 2:
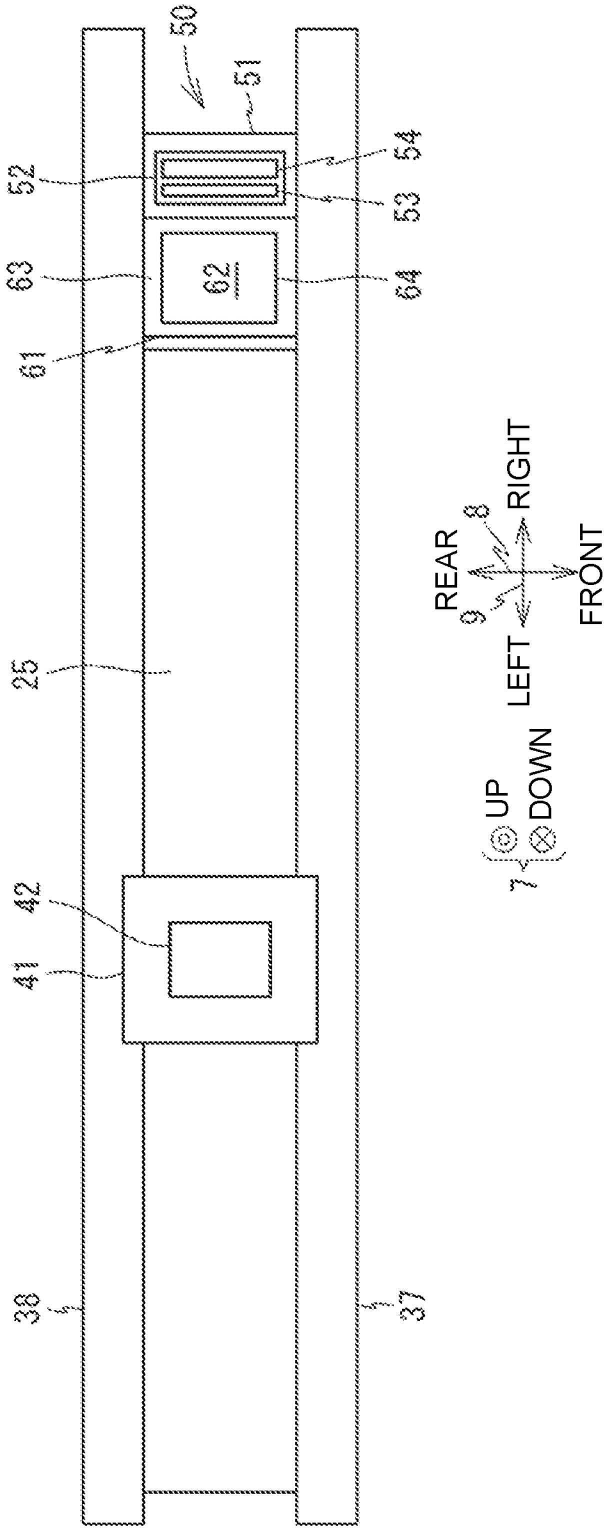
FIG. 2 is a view depicting a moving range of a carriage 41.
Figure 3:
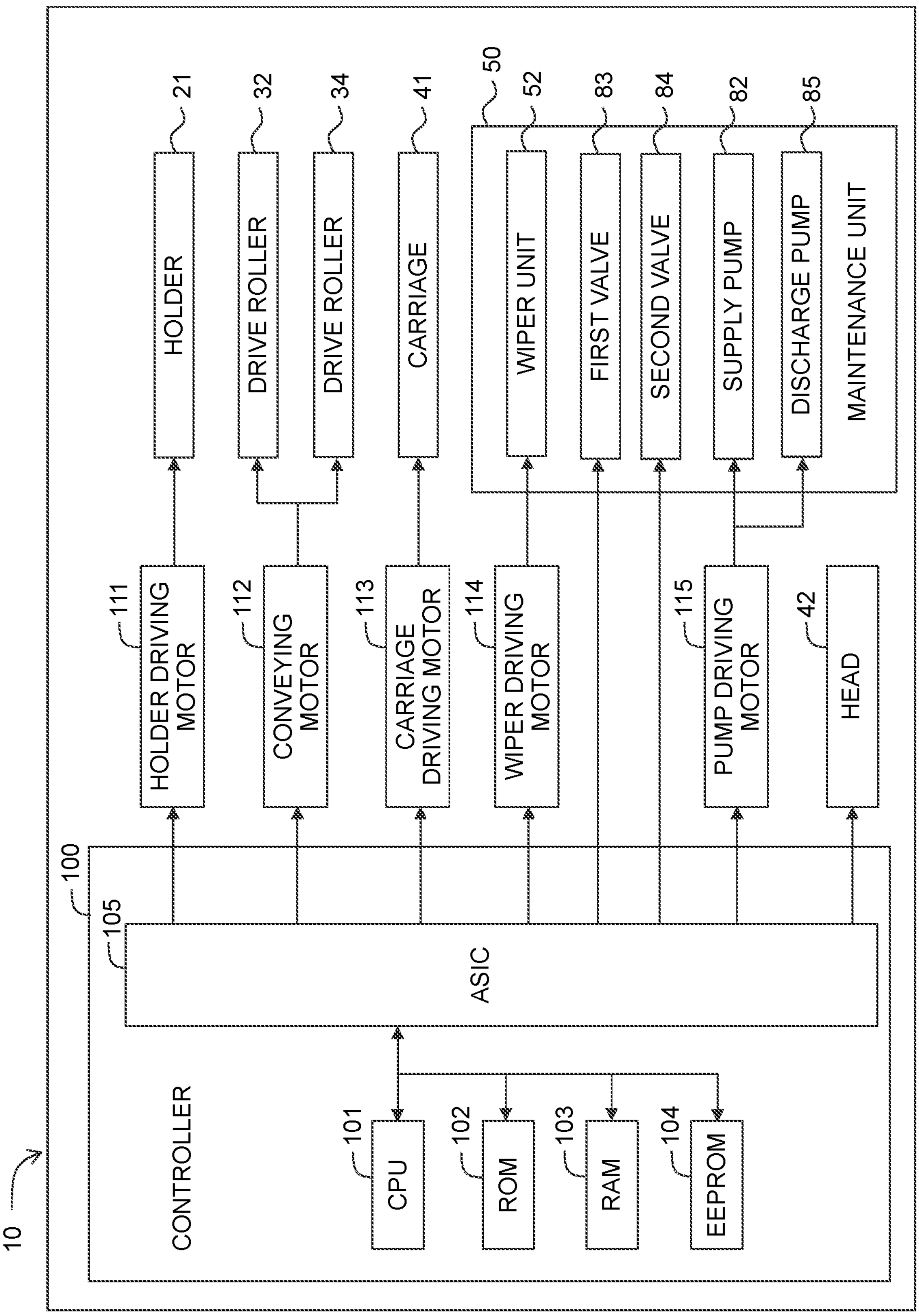
FIG. 3 is a block diagram depicting the configuration of a controller 100 and elements connected to the controller 100.

As depicted in FIG. 1, the printer 10 has, in the inside of the casing 11: a holder 21, a tensioner 22, a conveying roller pair 23, a discharging roller pair 24, a platen 25, four tanks 26A to 26D, a carriage 41 a and a head 42. The head 42 is mounted on the carriage 41. As depicted in FIG. 2, the printer 10 is further provided with, in the inside of the casing 11, two guide rails 37, 38 and a maintenance unit 50. As depicted in FIG. 3, the printer 10 has, within the casing 11, a controller 100, a holder driving motor 111, a conveying motor 112, a carriage driving motor 113, a wiper driving motor 114 and a pump driving motor 115. In addition to the above-described elements or components, the printer 10 may be further provided with a variety of kinds of sensors, a cap, etc.

[Tanks 26A to 26D]

The tanks 26A to 26D store yellow, magenta, cyan, and black inks (each of which is an example of a liquid), respectively. Each of the inks is a so-called latex ink and contains a pigment, resin fine particles, and an additive. Each of the inks has a viscosity suitable for uniformly dispersing the pigment and the resin fine particles. The pigment is the color of each of the inks. The resin fine particles are configured to adhere the pigment to the sheet S. For example, the resin is a synthetic resin of which temperature exceeds the glass transition temperature by, for example, being heated by a heater (not depicted in the drawings).

Note that it is sufficient that the printer 10 is provided with one tank. Further, the tank may store a liquid different from the ink. The liquid stored in the tank includes, for example, a pre-processing liquid (pre-treatment liquid). The pre-treatment liquid may include a cationic polymer, a polyvalent metal salt (e.g., a magnesium salt), etc. The pre-treatment liquid has a function of suppressing any ink blurring (ink blotting) and/or any ink bleed-through (back-through), by causing a component in the ink to aggregate or precipitate. In some cases, the pre-treatment liquid also has a function of improving the color developing property and/or the quick-drying property of the ink.

[Conveyance Mechanism for Sheet S]

A pair of side frames (not depicted in the drawings) spreading in the up-down direction 7 and the front-rear direction 8 are located in the inside of the casing 11. The holder 21 has a rotation shaft 31 which supports the sheet S. The rotation shaft 31 extends in the left-right direction 9 and both ends of the rotation shaft 31 are fixed to the side frames. The power from the holder driving motor 111 (see FIG. 3) is transmitted to the rotation shaft 31. This power causes the holder 21 to rotate in the circumferential direction of the rotation shaft 31. In FIG. 1, the direction of rotation of the holder 21 is counterclockwise. By the rotation of the holder 21, a roll body supported by the holder 21 also rotates. By the rotation of the conveying roller pair 23 and the discharging roller pair 24, the sheet S is drawn upwardly from a rear end of the roll body, and is guided to the tensioner 22.

Each of the tensioner 22, the conveying roller pair 23 and the discharging roller pair 24 extends in the left-right direction 9 between the side frames, and is attached to be rotatable in the circumferential direction of a rotational axis parallel to the left-right direction 9. A rearward urging force is applied to the tensioner 22 by an urging member such as a spring, etc. The tensioner 22 makes contact with the sheet S drawn from the roll body and guides the sheet S to be curved forward.

The conveying roller pair 23 has a drive roller 32 and a pinch roller 33, and is positioned at a location in front of the tensioner 22. The discharging roller pair 24 has a drive roller 34 and a pinch roller 35 and is positioned at a location further in front of the conveying roller pair 23. The positions of lower ends, respectively, of the drive rollers 32 and 34 are substantially coincident with the position of an upper end of the tensioner 22 in the up-down direction 7. The pinch roller 33 makes contact with the drive roller 32 from therebelow. The pinch roller 35 makes contact with the drive roller 34 from therebelow.

The power from the conveying motor 112 (see FIG. 3) is transmitted to the drive rollers 32 and 34. This power causes the drive rollers 32, 34 to rotate. With this, the drive rollers 32 and 34 convey the sheet S in a conveyance orientation 6 while pinching (nipping) the sheet S between the drive roller 32 and the pinch rollers 33, and between the drive roller 34 and the pinch roller 35. In this embodiment, the conveyance orientation 6 is frontward (frontward orientation).

[Platen 25]

The platen 25 is attached to the side frames at a location between the conveying roller pair 23 and the discharging roller pair 24 in the front-rear direction 8. The platen 25 extends in the left-right direction 9 between the side frames and has a support surface 36, for the sheet S, which spreads or extends in the front-rear direction 8 and the left-right direction 9. The support surface 36 is an upper end surface of the platen 25. An up-down position (position in the up-down direction 7) of the support surface 36 is substantially coincident with the position of the upper end of the tensioner 22. The platen 25 may be a suction platen which is configured to attract the sheet S, by suction, onto the support surface 36.

[Carriage 41 and Head 42]

As depicted in FIG. 2, the guide rails 37, 38 extend parallel to each other in the left-right direction 9. The positions in the up-down direction 7 of the guide rails 37 and 38 are same. The guide rail 38 is positioned behind the guide rail 37 in the front-rear direction 8. Both ends of each of the guide rails 37 and 38 are fixed to the side frames. The carriage 41 is supported by the guide rails 37 and 38. The power of the carriage driving motor 113 (see FIG. 3) is transmitted to a carriage driving mechanism (not depicted in the drawings). The carriage 41 is moved in the left-right direction 9 by the action of the carriage driving mechanism in a state that the carriage 41 is supported by the guide rails 37, 38.

The carriage 41 is movable (moves) having the head 42 mounted thereon. A lower surface of the head 42 is referred to as a nozzle surface 43 (see FIG. 1). A plurality of nozzles 44 which are configured to eject or discharge the inks are formed in the nozzle surface 43. The tanks 26A to 26D and the head 42 are connected via an ink channel (not depicted in the drawings). The inks stored, respectively, in the tanks 26A to 26D are supplied to the head 42 via the ink channel. While the carriage 41 is moving in the left-right direction 9, the ink(s) supplied to the head 42 is (are) ejected from the plurality of nozzles 44. With this, image recording is performed on the sheet S.

[Controller 100]

As depicted in FIG. 3, the controller 100 includes a CPU 101, a ROM 102, a RAM 103, an EEPROM 104 and an ASIC 105. The ROM 102 stores various kinds of data, etc., necessary for the operation of the controller 100. The RAM 103 is a working memory of the CPU 101. The EEPROM 104 stores a control program, etc., executed by the CPU 101. Before the printer 10 performs the image recording, the control program stored in the EEPROM 104 is copied to the RAM 103. The CPU 101 execute the control program stored in RAM 103. With this, the controller 100 executes an image recording processing, a cleaning liquid supplying processing which will be described later on, etc.

The controller 100 is electrically connected, via the ASIC 105, to the holder driving motor 111, the conveying motor 112, the carriage driving motor 113, the wiper driving motor 114, the pump driving motor 115, a first valve 83 and a second valve 84 included in the maintenance unit 50, and the head 42. Each of the holder driving motor 111, the conveying motor 112, the carriage driving motor 113, the wiper driving motor 114 and the pump driving motor 115 rotates in accordance with the control from the controller 100, and generates the power (motive power). Each of the first valve 83 and the second valve 84 changes the state thereof between an open state and a close state by the control from the controller 100. The head 42 ejects the ink(s) to the sheet S which is (being) conveyed on the platen 25, in accordance with the control from the controller 100.

The holder 21 rotates by the power from the holder driving motor 111. The drive rollers 32 and 34 rotate by the power from the conveying motor 112. The sheet S is conveyed in the conveyance orientation 6 by the power from the conveying motor 112. The carriage 41 moves in the left-right direction 9 by the power from the carriage driving motor 113. A wiper unit 52 included in the maintenance unit 50 performs an operation which will be described later on by the power from the wiper driving motor 114. The supply pump 82 and the discharge pump 85 perform an operation which will be described later on by the power from the pump driving motor 115. Note that it is allowable that a part of the holder driving motor 111, the conveying motor 112, the carriage driving motor 113, the wiper driving motor 114 and the pump driving motor 115 may be realized by a common motor (single motor). Further, it is allowable that the motor driving the supply pump 82 and the motor driving the discharge pump 85 may be separate motors.

[Moving Range of Carriage 41]

As depicted in FIG. 2, the platen 25 has a shape which is long in the left-right direction 9 and is located at a position which is below the carriage 41 in the up-down direction 7 (see FIG. 1). A left end of the platen 25 is positioned, in the left-right direction 9, in the vicinity of left ends of the guide rails 37 and 38. A right end of the platen 25 is positioned, in the left-right direction 9, at a location on the right side with respect to the centers in the left-right direction 9, respectively, of the guide rails 37, 38. The maintenance unit 50 is positioned, in the left-right direction 9, on the right side with respect to the platen 25. While the printer 10 is executing the image recording, the carriage 41 moves in the left-right direction 9 within a range of the platen 25. While the printer 10 is not executing the image recording, the carriage 41 is located at a position which is on the right side with respect to the maintenance unit 50 (hereinafter referred to as a "standby position").

[Maintenance Unit 50]

Figure 4:
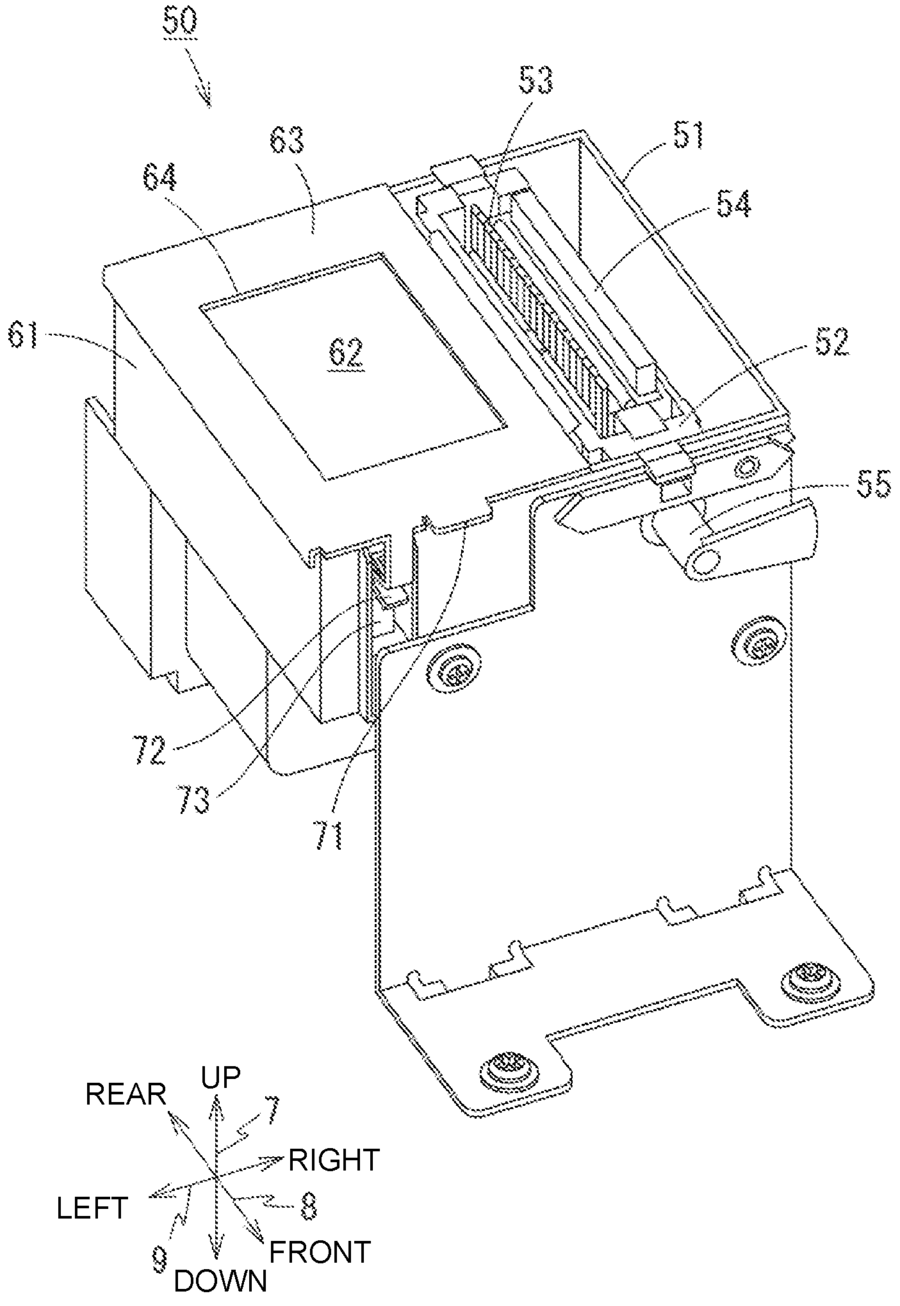
FIG. 4 is a perspective view depicting the outer appearance of a maintenance unit 50.
Figure 5:
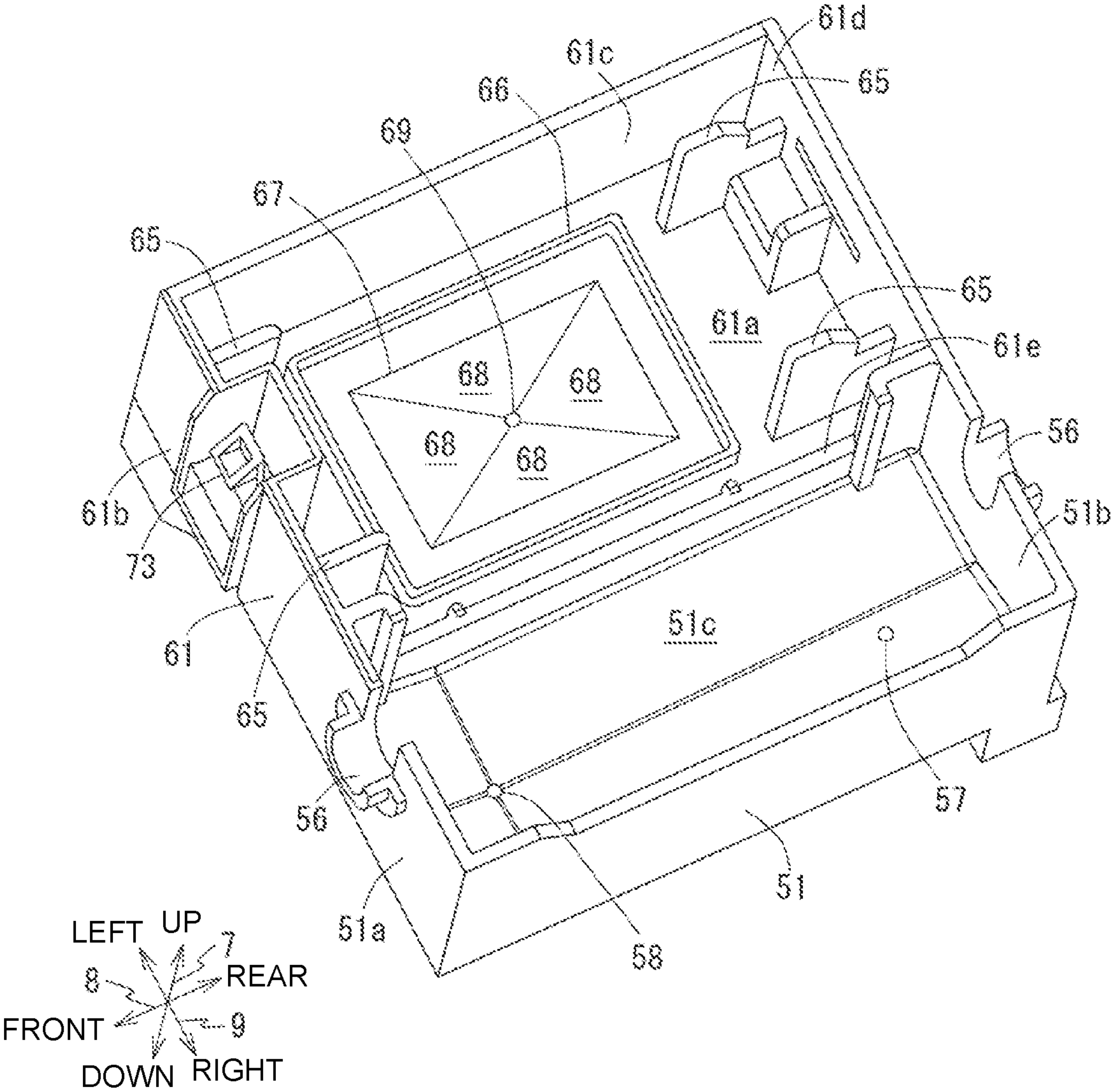
FIG. 5 is a perspective view depicting the inside of a wiper tank 51 and the inside of a flushing tank 61.

The maintenance unit 50 is configured to perform maintenance of the head 42. As depicted in FIG. 4, the maintenance unit 50 is provided with: a wiper tank 51 (an example of a first tank), a wiper unit 52, a flushing tank 61 (an example of a second tank) and a flushing foam 62. The wiper unit 52 has two wipers 53 and 54. An upper part of the flushing tank 61 is covered by a plate member 63. FIG. 5 depicts the insides of the wiper tank 51 and the flushing tank 61 in a state that the wiper unit 52, the flushing foam 62 and the plate member 63 are detached (omitted).

As depicted in FIG. 6, the maintenance unit 50 is further provided with: a cleaning liquid tank 81, a supply pump 82, the first valve 83, the second valve 84, a discharge pump 85 and a waste liquid tank 86. The flushing tank 61 is adjacent to the wiper tank 51, and is located on the left side with respect to the wiper tank 51. The wiper tank 51 and the flushing tank 61 are integrally formed. Note that the wiper tank 51 is an example of a "first tank", and that the flushing tank 61 is an example of a "second tank".

[Wiper Tank 51 and Wiper Unit 52]

As depicted in FIG. 5, the wiper tank 51 has a box-like shape of which upper part is opened. As depicted in FIGS. 6A and 6B, the wiper tank 51 accommodates a cleaning liquid L in the inside thereof. The cleaning liquid L is a liquid suitable for removing any unwanted substance (unnecessary matter) adhered to the nozzle surface 43 of the head 42. As the cleaning liquid L, for example, glycerin is used.

The wipers 53 and 54 are attached to the wiper unit 52 so that forward end parts, respectively, of the wipers 53 and 54 are located at the outside of the wiper tank 51. The wiper 53 is not impregnated with the cleaning liquid L and deforms in response to an external force while maintaining the shape of the wiper 53 to some extent. On the other hand, the wiper 54 is impregnated with the cleaning liquid L and deforms, with a high degree of freedom, in response to the external force. The wiper 53 is formed, for example, of a rubber material. The wiper 54 is formed, for example, of a porous material.

As depicted in FIG. 4, the wiper unit 52 has a rotation shaft 55. As depicted in FIG. each of a front wall 51*a* and a rear wall 51*b* of the wiper tank 51 has a support part 56. The two support parts 56, respectively, of the front wall 51*a* and the rear wall 51*b* are configured to support a front end and a rear end of the rotation shaft 55. With this, the wiper unit 52 is supported by the wiper tank 51 so that the wiper unit 52 is rotatable with the rotation shaft 55 as the center of the rotation.

The power of the wiper driving motor 114 (see FIG. 3) is transmitted to a wiper driving mechanism (not depicted in the drawings), thereby causing the rotation shaft 55 to make a half rotation; accompanying with this, the wiper unit 52 and the wipers 53 and 54 make a half rotation with the rotation shaft 55 as the center of the half rotation. With this, the wiper unit 52 rotates (pivots) to a position at which the forward end parts of the wipers 53 and 54 are oriented upward (a position depicted in FIG. 6A, hereinafter referred to as an "upward position") and to a position at which the forward end parts of the wipers 53 and 54 are oriented downward (a position depicted in FIG. 6B, hereinafter referred to as a "downward position").

In a case that the wiper unit 52 is located at the upward position, the wipers 53 and 54 are not immersed in the cleaning liquid L stored the wiper tank 51, and are located at a position at which the wipers 53 and 54 are capable of making contact with the nozzle surface 43 of the head 42. In a case that the wiper unit 52 is located at the downward position, a part of the wiper 53 and a part of the wiper 54 are immersed in the cleaning liquid L stored in the wiper tank 51, and the wipers 53 and 54 are located at a position at which the wipers 53 and 54 are not capable of making contact with the nozzle surface 43. Note that the upward position is an example of a “first position”, and the downward position is an example of a “second position”.

In a case that the controller 100 performs a wipe processing, the controller 100 moves the wiper unit 52 to the upward position, and moves the carriage 41 leftward at the location above the wiper unit 52. In this situation, the wipers 53 and 54 make contact with the nozzle surface 43 of the head 42 and wipes the cleaning liquid and/or the unwanted substance (the ink, any waste, debris, etc.) adhered to the nozzle surface 43.

As depicted in FIG. 5, a supply port 57 and a discharge port 58 are positioned in a lower wall 51*c* of the wiper tank 51. The supply port 57 is configured to supply the cleaning liquid L to the wiper tank 51. The discharge port 58 is configured to discharge (drain) the cleaning liquid L from the wiper tank 51.

[Flushing Tank 61 and Flushing Foam 62]

As depicted in FIG. 5, the flushing tank 61 has a box-like shape of which upper part is opened. As depicted in FIGS. 6A and 6B, the flushing tank 61 is configured to accommodate or store the flushing foam 62 therein. The flushing foam 62 is formed of a porous material. The flushing foam 62 is, for example, a sponge.

As depicted in FIG. 4 and FIGS. 6A and 6B, the plate member 63 is configured to cover an upper part of the flashing tank 61. The plate member 63 has an opening 64 which is located in a central part of the plate member 63 and which exposes a part of the upper surface of the flashing foam 62 in a state that the plate member 63 is locked to the flushing tank 61. The plate member 63 covers the entirety of the upper part of the flushing tank 61, except for the position at which the opening 64 is located. In the state that the plate member 63 is locked to the flushing tank 61, the plate member 63 causes a downward force to act on the flushing foam 62 accommodated in the flushing tank 61.

In a case that the controller 100 performs a flushing processing, the controller 100 moves the carriage 41 to a location above the flushing tank 61. The opening 64 is formed so that all the plurality of nozzles 44 of the head 42 at this time face the flushing foam 62. It is desired that the size of the opening 64 is same as, or is slightly greater than, the size of an arrangement area of the plurality of nozzles 44 in the head 42. The flushing foam 62 accommodated in the flushing tank 61 is configured to absorb the ink(s) ejected from the plurality of nozzles 44 of the head 42 by the flushing processing.

As depicted in FIG. 5, the flushing tank 61 has a lower wall 61*a*, a front wall 61*b*, a left wall 61*c*, a rear wall 61*d*, and a partition 61*e*. The front wall 61*b* has two ribs 65 protruding towards the internal space of the flushing tank 61; and the rear wall 61*d* also has two ribs 65 protruding towards the internal space of the flushing tank 61. An annular rib 66 protruding towards the internal space of the flushing tank 61 is located at a central part of an inner surface of the lower wall 61*a*. The planar shape of the rib 66 is substantially rectangular. In a case that the flushing foam 62 is placed in the flushing tank 61 in a state that the plate member 63 does not cover the upper part of the flushing tank 61, a bottom surface of the flushing foam 62 makes contact with an upper surface of the rib 66 without being deformed. Afterwards, in a case that such a state is provided wherein the plate member 63 covers the upper part of the flushing tank 61, a part, of the bottom surface of the flushing foam 62 accommodated in the flushing tank 61, which makes contact with the upper surface of the rib 66 is deformed, and a part of the rib 66 bits into the flushing foam 62. In this state, the rib 66 supports the bottom surface of the flushing foam 62.

A recessed part 67 is positioned in a part, in the inner surface of the lower wall 61*a*, which is surrounded by the rib 66. The recessed part 67 is a part which is further away outwardly from the internal space of the flushing tank 61 as closer to the center of the recessed part 67, and which is formed by four triangular-shaped inclined surfaces 68. A discharge port 69 is positioned at the center of the recessed part 67. The discharge port 69 is configured to discharge (drain) the cleaning liquid from the flushing tank 61.

The plate member (plate-like member) 63 is a member obtained by forming the opening 64 in a plate made of a metal and by machining the respective ends of the metal plate. As depicted in FIGS. 6A and 6B, a left end and a right end of the plate member 63 are bent in the up-down direction 7. A rear end of the plate member 63 is fixed to the outer side of the rear wall 61*d* of the flashing tank 61, via a plate spring (not depicted in the drawings). As depicted in FIG. 4, an operating part 71 and a hook 72 are positioned at a front end of the plate member 63. As depicted in FIG. 5, a hook receiving part 73 is positioned at the outer side of the front wall 61*b* of the flushing tank 61. In a case that the plate member 63 covers the upper part of the flushing tank 61, the hook 72 is engaged with the hook receiving part 73, and the plate member 63 is locked to the flushing tank 61.

In a case that the flushing processing is performed repeatedly, there arises a need to exchange the flushing foam 62. In a case that the user of the printer 10 exchanges the flushing foam 62, the user lifts the operating part 71 upwardly until the hook 72 is detached from the hook receiving part 73. In a case that the hook 72 is detached from the hook receiving part 73, the plate member 63 rotates with the rear end side thereof as the center of rotation due to the urging force of the plate spring, and is away from the upper surface of the flushing tank 61.

[Supply and Discharge (Draining) of Cleaning Liquid]

As depicted in FIGS. 6A and 6B, the supply port 57 of the wiper tank 51 is connected to one end of the supply pump 82 via a tube 92. The other end of the supply pump 82 is connected to the cleaning liquid tank 81 via a tube 91. The cleaning liquid tank 81 stores an unused cleaning liquid. In a case that the supply pump 82 is driven by the pump driving motor 115 (see FIG. 3), the supply pump 82 supplies the unused cleaning liquid stored in the cleaning liquid tank 81 to the wiper tank 51. The wiper tank 51 stores the cleaning liquid supplied from the cleaning liquid tank 81 by using the supply pump 82.

As depicted in FIGS. 5, 6A and 6B, the wiper tank 51 and the flushing tank 61 are partitioned from each other by the partition 61*e*. The partition 61*e* is lower than the front wall 61*b*, the left wall 61*c* and the rear wall 61*d*. In a case that the supply pump 82 is operated and that the cleaning liquid of which amount is not less than a predetermined amount is supplied from the cleaning liquid tank 81 to the wiper tank 51, a part of the cleaning liquid L stored in the wiper tank 51 flows over the partition 61*e* and flows into the inside of the flushing tank 61. In such a manner, the cleaning liquid is supplied to the flushing tank 61 via the wiper tank 51. The cleaning liquid overflown from the wiper tank 51 is supplied to the flushing tank 61, over (across) the partition 61*e*. The cleaning liquid supplied to the flushing tank 61 flows through the space at the outside of the rib 66 and surrounds the outer side of the rib 66. The cleaning liquid located at the outside of the rib 66 is absorbed by the flushing foam 62 and diffuses in the inside of the flushing foam 62. A configuration of supplying the cleaning liquid to the flushing tank 61 via the wiper tank 51 has such a merit that the nozzle surface 43 of the head 42 is not wiped by a cleaning liquid which is dirtied due to the flushing foam 62 absorbing the ink and immersed in the cleaning liquid.

As depicted in FIGS. 6A and 6B, the discharge port 58 of the wiper tank 51 is connected to a first terminal of a joint 87 via a tube 93, the first valve 83 and a tube 94. The discharge port 69 of the flushing tank 61 is connected to a second terminal of the joint 87 via a tube 95, the second valve 84 and a tube 96. A third terminal of the joint 87 is connected to one end of the discharge pump 85 via a tube 97. The other end of the discharge pump 85 is connected to the waste liquid tank 86 via a tube 98. As described above, each of the first valve 83 and the second valve 84 changes the state thereof between the open state and the close state in accordance with the control from the controller 100. In a case that the discharge pump 85 is driven by the pump driving motor 115 (see FIG. 3), the discharge pump 85 applies a negative pressure to a channel arriving at the discharge port 58 or a channel arriving at the discharge port 69, depending on the open/close state of each of the first valve 83 and the second valve 84.

In a case that the discharge pump 85 is driven with the first valve 83 being in the open state and with the second valve 84 being in the close state, the negative pressure is applied to the channel arriving at the discharge port 58. In this situation, the cleaning liquid L stored in the wiper tank 51 is sucked (suctioned); the cleaning liquid L stored in the wiper tank 51 is discharged (drained) to the waste liquid tank 86 via the discharge port 58, the tube 93, the first valve 83, the tube 94, the joint 87, the tube 97, the discharge pump 85 and the tube 98.

In a case that the discharge pump 85 is driven with the first valve 83 being in the close state and with the second valve 84 being in the open state, the negative pressure is applied to the channel arriving at the discharge port 69, and a negative pressure is applied to a space 74 at a location below the flushing foam 62. In this situation, the ink and the cleaning liquid L in the flushing foam 62 are sucked and quickly moved downward. The ink and the cleaning liquid arriving at the space 74 are discharged (drained) to the waste liquid tank 86 via the discharge port 69, the tube 95, the second valve 84, the tube 96, the joint 87, the tube 97, the discharge pump 85 and the tube 98. In such a manner, the discharge pump 85 causes the cleaning liquid to be discharged (drained) from the wiper tank 51 and the flushing tank 61.

[Image Recording Processing]

With reference to FIG. 7, an image recording processing by the controller 100 will be explained. At a point of time that the controller 100 reaches step S11, the carriage 41 is located at the standby position and the wiper unit 52 is located at the downward position. At this time, the part of the wiper 53 and the part of the wiper 54 are immersed in the cleaning liquid L stored in the wiper tank 51.

The controller 100 receives an image recording instruction from an operation part (not depicted in the drawings) (step S11). Specifically, the controller 100 stands by in step S11 until the controller 100 receives the image recording instruction. In a case that the controller 100 receives the image recording instruction in step S11, the controller 100 controls the wiper driving motor 114 to thereby move the wiper unit 52 to the upward position (step S12).

Next, the controller 100 executes the wipe processing (step S13). In step S13, the controller 100 controls the carriage driving motor 113 to thereby cause the carriage 41 to move in the leftward orientation from the standby position to a position above the wiper unit 52. In this situation, the carriage 41 moves in the leftward orientation while the wipers 53 and 54 are making contact with the nozzle surface 43 of the head 42. The controller 100 controls the carriage driving motor 113 to thereby cause the carriage 41 to move to a position at which the wipers 53 and 54 do not make contact with the nozzle surface 43 of the head 42. At this point of time, the controller 100 ends the wipe processing. Next, the controller 100 controls the wiper driving motor 114 to thereby cause the wiper unit 52 to move to the downward position (step S14).

Next, the controller 100 controls the carriage driving motor 113 to thereby move the carriage 41 in the leftward orientation to a recording start position (step S15). The recording start position is a predetermined position at which the carriage 41 faces the platen 25. Next, the controller 100 controls the holder driving motor 111 and the conveying motor 112 to thereby convey the sheet S to the recording start position (step S16). Note that the controller 100 may execute step S16 in parallel to all or a part of steps S12 to S15.

Next, the controller 100 executes image recording on the sheet S (step S17). In step S17, the controller 100 controls the carriage driving motor 113 to thereby move the carriage 41 in the left-right direction 9 (to move leftward or rightward orientation). The controller 100 controls the head 42 during a period in which the carriage 41 is moving in the left-right direction 9, to thereby cause the plurality of nozzles 44 of the head 42 to eject the ink(s) of an amount corresponding to image data.

Next, the controller 100 determines whether there is any remaining image data or not (step S18). In accordance with the determination made by the controller 100 in step S18 that there is the remaining data (step S18: YES), the controller 100 proceeds to step S19. In this case, the controller 100 controls the conveying motor 112 to thereby convey the sheet S by a predetermined amount (step S19). Then, the controller 100 proceeds to step S17.

In accordance with the determination made by the controller 100 in step S18 that there is not any remaining data (step S18: NO), the controller 100 proceeds to step S20. In this case, the controller 100 controls the conveying motor 112 to thereby discharge the sheet S up to a predetermined position (step S20). Next, the controller 100 controls the carriage driving motor 113 to thereby move the carriage 41 in the rightward orientation up to the standby position (step S21). Then, the controller 100 proceeds to step S11 so as to execute a next image recording.

[Flushing Processing]

In a case, for example, that an elapsed time which has elapsed since the flushing processing executed the last time exceeds a threshold value or in a case that the controller 100 receives an instruction from the user of the printer 10, the controller 100 determines that the flushing processing needs to be performed. The controller 100 performs the flushing processing in accordance with the determination made by the controller 100 that the flushing processing needs to be performed.

As described above, in a case that the controller 100 performs the flushing processing, the controller 100 controls the carriage driving motor 113 to thereby cause the carriage 41 to move to the location above the flushing tank 61. The opening 64 is formed such that in the above-described situation all of the plurality of nozzles 44 of the head 42 face the flushing foam 62. The controller 100 performs a control of causing the head 42 to eject, from the plurality of nozzles 44, the ink(s) of an amount suitable for the flushing processing. The flushing foam 62 accommodated in the flushing tank 61 absorbs the ink(s) ejected from the plurality of nozzles 44 of the head 42 by the flushing processing.

Since the flushing foam 62 is impregnated with the cleaning liquid L, the ink(s) absorbed by the flushing foam 62 moves downwardly, together with the cleaning liquid, in the inside of the flushing foam 62, and reaches the space 74 defined at the location below the flushing foam 62.

While performing the flushing processing or after performing the flushing processing, the controller 100 performs control so as to make the first valve 83 to be in the close stand and to make the second valve 84 to be in the open state and drives the pump driving motor 115 (see FIG. 3) to thereby cause the discharge pump 85 to apply the negative pressure to the space 74. In this situation, the ink and the cleaning liquid in the inside of the flushing foam 62 are sucked and move quickly downward, and the ink and the cleaning liquid which have reached the space 74 are sucked and discharged (drained) to the waste liquid tank 86.

[Calculation of Remaining Amount of Cleaning Liquid and Rate of Evaporation]

In the printer 10, in a case that a water content of the cleaning liquid L stored in the wiper tank 51 is evaporated and a concentration of the cleaning liquid L becomes high, the viscosity of the cleaning liquid L becomes to be high. Accordingly, in a case that the controller 100 performs the wipe processing, the nozzle surface 43 of the head 42 cannot be wiped cleanly and/or that the cleaning liquid L which has become highly viscous clogs the nozzles 44, which in turn leads to any unsatisfactory ejection of the head 42, in some cases. In a case that the viscosity of the cleaning liquid L becomes high in such a manner, the effect of the wipe processing is lowered, and thus the concentration of the cleaning liquid L stored in the wiper tank 51 is required to be maintained to be not more than a predetermined concentration (value).

In view of this, the controller 100 performs a processing of calculating a remaining amount of the cleaning liquid L stored in the wiper tank 51 (hereinafter referred to as a "remaining amount P"), a processing of calculating a vacant capacity (space capacity, free space capacity) of the wiper tank 51 (hereinafter referred to as a "vacant capacity Q"), and a processing of calculating an evaporation rate of the cleaning liquid L stored in the wiper tank 51 (hereinafter referred to as an "evaporation rate R"). The sum of the remaining amount P and the vacant capacity Q equals to the capacity of the wiper tank 51. As an example, the evaporation rate R may be calculated by the equation of $R=1-\{P/(P+Q)\}$.

In a case that the controller 100 executes the processing of step S110, step S120 or step S130 as depicted in FIG. 8 (details of which will be described later on), the controller 100 resets the remaining amount P and makes the remaining amount P to be a capacity of the wiper tank 51. The capacity of the wiper tank 51 is a maximum amount of the cleaning liquid storable in the wiper tank 51, namely, an amount of the cleaning liquid in a case that the height of a liquid surface of the cleaning liquid is equal to a height of the partition 61*e*.

In a case that the controller 100 starts the image recording, in a case that the controller 100 ends the image recording and in a case that a predetermined time (for example, 1 (one) hour) elapses since execution of the image recording, the controller 100 newly calculates and updates the remaining amount P. The controller 100 obtains the temperature and the humidity from a temperature sensor and a humidity sensor (both of which are not depicted in the drawings) provided on the printer 10, and the controller 100 newly calculates the remaining amount P based on the remaining amount P calculated the last time, an elapsed time elapsed since the remaining amount P has been calculated the last time (an elapsed time during the image recording and an elapsed time during which the image recording is not performed), the temperature obtained from the temperature sensor, the humidity obtained from the humidity sensor, etc. In a case that the controller 100 resets or newly calculates the remaining amount P, the controller 100 deducts the remaining amount P from the capacity of the wiper tank 51 to thereby calculates the vacant capacity Q.

In a case that the controller 100 executes step S110 indicated in FIG. 8, the controller 100 resets the evaporation rate R so as to make the evaporation rate R to be 0 (zero). In a case that the controller 100 executes step S120 or step S130 indicated in FIG. 8, in a case that the controller 100 starts the image recording, in a case that the controller 100 ends the image recording, and in a case that the predetermined time elapses since the execution of the image recording, the controller 100 updates the evaporation rate R by newly calculating the evaporation rate R. In a case that the controller 100 executes step S120 or step S130, the controller 100 newly calculates the evaporation rate R based on the remaining amount P calculated the last time, the evaporation rate R calculated the last time, the amount of the cleaning liquid to be supplied to the wiper tank 51, etc. In a case that the controller 100 starts the image recording, in a case that the controller 100 ends the image recording and in a case that the predetermined time elapses since execution of the image recording, the controller 100 newly calculates the evaporation rate R based on the remaining amount P calculated the last time, the evaporation rate R calculated the last time, an elapsed time elapsed since the evaporation rate R has been calculated the last time, the temperature obtained from the temperature sensor, the humidity obtained from the humidity sensor, etc.

Note that each of the remaining amount P, the vacant capacity Q and the evaporation rate R calculated by the controller 100 is a presumed value. It is allowable that the controller 100 directly calculates the vacant capacity Q, instead of calculating the remaining amount P.

[Cleaning Liquid Supplying Processing]

A cleaning liquid supplying processing by the controller 100 will be explained with reference to FIGS. 8 to 11. In a case that a predetermined condition is satisfied, the controller 100 executes the cleaning liquid supplying processing indicated in FIG. 8. The controller 100 may execute the cleaning liquid supplying processing, for example, in a case that the power source of the printer 100 is switched ON. Alternatively, the controller 100 may execute the cleaning liquid supplying processing at a frequency of once a day. It is presumed that, at a point of time at which the controller 100 starts the cleaning liquid supplying processing, the first valve 83 and the second valve 84 are both in the close state.

At the beginning of the cleaning liquid supplying processing (FIG. 8), the controller 100 obtains the evaporation rate R of the cleaning liquid L stored in the wiper tank 51 (step S101). Next, the controller 100 obtains an elapsed time (hereinafter referred to as an "elapsed time T") elapsed since the flushing processing which has been performed first (first flushing processing) after cleaning of the flushing tank 61 (step S102).

Next, the controller 100 determines as to whether or not the evaporation rate R is not less than a second threshold value Th2 (step S103). In accordance with a determination made by the controller 100 in step S103 that the evaporation rate R is not less than the second threshold value Th2 (step S103: YES), the controller 100 proceeds to step S104. In this case, the controller 100 determines as to whether or not the elapsed time T is not less than a first threshold value Th1 (step S104). In accordance with a determination made by the controller 100 in step S104 that the elapsed time T is less than the first threshold value Th1 (step S104: NO), the controller 100 proceeds to step S110. In this case, the controller 100 executes a wiper tank-cleaning processing indicated in FIG. 9 (step S110).

In accordance with a determination made by the controller 100 in step S104 that the elapsed time T is not less than the first threshold value Th1 (step S104: YES), the controller 100 proceeds to step S120. In this case, the controller 100 executes an adding-to-wiper tank and flushing tank-cleaning processing indicated in FIG. 10 (step S120).

In accordance with a determination made by the controller 100 in step S103 that the evaporation rate R is less than the second threshold value Th2 (step S103: NO), the controller 100 proceeds to step S105. In this case, the controller 100 determines as to whether or not the elapsed time T is not less than a third threshold value Th3 (step S105). The third threshold value Th3 is greater than the first threshold value Th1. For example, the first threshold value Th1 is 48 hours, and the third threshold value Th3 is 72 hours. In accordance with a determination made by the controller 100 in step S105 that the elapsed time T is not less than the third threshold value Th3 (step S105: YES), the controller 100 proceeds to step S130. In this case, the controller 100 executes a flushing tank-cleaning processing indicated in FIG. 11 (step S130).

After the controller 100 executes any one of step S110, step S120 and step S130, the controller 100 ends the cleaning liquid supplying processing. In accordance with a determination made by the controller 100 in step S105 that the elapsed time is less than the third threshold value Th3 (step S105: NO), the controller 100 ends the cleaning liquid supplying processing, without executing any one of step S110, step S120 and step S130. Note that step S110 is an example of a "first processing", that step S120 is an example of a "second processing" and that step S130 is an example of a "third processing". The first flushing processing is an example of a "first predetermined processing regarding the second tank".

At the beginning of the wiper tank-cleaning processing (step S110) indicated in FIG. 9, the controller 100 performs control so as to make the first value 83 to be in the open state (step S111). Next, the controller 100 drives the discharge pump 85 so as to cause the cleaning liquid to be discharged from the wiper tank 51 (step S112). In step S112, all the cleaning liquid stored in the wiper tank 51 is discharged via the discharge port 58.

Next, the controller 100 performs control so as to make the first value 83 to be in the close state (step S113). Next, the controller 100 drives the supply pump 82 so as to supply the cleaning liquid of a first amount V1 to the wiper tank 51 (step S114). The first amount V1 is not less than the capacity of the wiper tank 51. More specifically, the first amount V1 is an amount not less than the capacity of the wiper tank 51 and may be less than an amount required for executing the flushing tank-cleaning processing (step S130). It is preferred that the first amount V1 is slightly greater than the capacity of the wiper tank 51. After the controller 100 executes step S114, the controller 100 ends the wiper tank-cleaning processing.

At the beginning of the adding-to-wiper tank and flushing tank-cleaning processing (step S120) indicated in FIG. 10, the controller 100 performs control so as to make the second value 84 to be in the open state (step S121). Next, the controller 100 drives the discharge pump 85 so as to cause the cleaning liquid to be discharged from the flushing tank 61 (step S122). In step S122, the ink and the cleaning liquid, including the ink and the cleaning liquid which are absorbed in the flushing foam 62, are discharged (drained) from the flushing tank 61 via the discharge port 69.

While the controller 100 drives the discharge pump 85 so as to cause the cleaning liquid to be discharged from the flushing tank 61 (step S123), the controller 100 drives the supply pump 82 so as to supply the cleaning liquid of a fourth amount V4 to the wiper tank 51 (step S124). The controller 100 executes step S123 and step S124 in parallel. While the controller 100 causes the cleaning liquid of the fourth amount V4 to be supplied to the wiper tank 51 in step S124, the controller 100 causes the discharge pump 85 to perform an idle suction. By causing the discharge pump 85 to perform the idle suction, it is possible to suppress the cleaning liquid overflown from the wiper tank 51 and flowed into the flushing tank 61 from overflowing from the flushing tank 61.

Next, the controller 100 performs control so as to make the second value 84 to be in the close state (step S125). Next, the controller 100 drives the supply pump 82 so as to supply, to the wiper tank 51, the cleaning liquid of a second amount V2 in the entirety (total) of the adding-to-wiper tank and flushing tank-cleaning processing (step S126).

The fourth amount V4 is a value which is not a smaller value (that is, a larger value) of a predetermined fix amount and the vacant capacity Q. The second value V2 is a sum of the fourth amount V4 and an amount of the cleaning liquid (to be) supplied to the flushing tank 61. The second amount V2 is not less than a sum of the vacant capacity Q and the amount of the cleaning liquid (to be) supplied to the flushing tank 61.

At a point of time at which the controller 100 arrives at step S125, the wiper tank 51 is in a full state. Due to this, the cleaning liquid supplied to the wiper tank 51 in step S126 overflows from the wiper tank 51, flows over (across) the partition 61*e* and is supplied to the flushing tank 61. Accordingly, the cleaning liquid of a desired amount is supplied to the flushing tank 61 via the wiper tank 51. After the controller 100 executes step S126, the controller 100 ends the flushing tank-cleaning processing.

At the beginning of the flushing tank-cleaning processing (step S130) indicated in FIG. 11, the controller 100 performs control so as to make the second value 84 to be in the open state (step S131). Next, the controller 100 drives the discharge pump 85 so as to cause the cleaning liquid to be discharged from the flushing tank 61 (step S132). In step S132, the ink and the cleaning liquid, including the ink and the cleaning liquid which are absorbed in the flushing foam 62, are discharged (drained) from the flushing tank 61 via the discharge port 69.

While the controller 100 drives the discharge pump 85 so as to cause the cleaning liquid to be discharged from the flushing tank 61 (step S133), the controller 100 drives the supply pump 82 so as to supply the cleaning liquid to the wiper tank 51 until the cleaning liquid slightly overflows from the wiper tank 51 (step S134). The controller 100 executes step S133 and step S134 in parallel. In step S134, the controller 100 supplies, to the wiper tank 51, the cleaning liquid of which amount is equal to the vacant capacity Q.

Next, the controller 100 performs control so as make the second value 84 to be in the close state (step S135). Next, the controller 100 drives the supply pump 82 so as to supply, to the wiper tank 51, the cleaning liquid of a third amount V3 in the entirety of the flushing tank-cleaning processing (step S136). The third amount V3 is a sum of the vacant capacity Q and the amount of the cleaning liquid (to be) supplied to the flushing tank 61. The third amount V3 is not more than the second amount V2.

At a point of time at which the controller 100 arrives at step S135, the wiper tank 51 is in a full state. Due to this, the cleaning liquid supplied to the wiper tank 51 in step S136 overflows from the wiper tank 51, flows over (across) the partition 61*e* and is supplied to the flushing tank 61. Accordingly, the cleaning liquid of a desired amount is supplied to the flushing tank 61 via the wiper tank 51. After the controller 100 executes step S136, the controller 100 ends the flushing tank-cleaning processing.

In the printer 10, in a case that the elapsed time T is not less than the third threshold value Th3, there is such a possibility that the ink on the flushing foam 62 might be fixed to the flushing foam 62. Accordingly, in accordance with a determination made by the controller 100 in step S105 that the elapsed time T is not less than the third threshold value Th3 (step S105: YES), the controller 100 executes the flushing tank-cleaning processing (step S130).

In a case that the elapsed time T is not less than the first threshold value Th1 and less than the third threshold value Th3, the ink on the flushing foam 62 has not been fixed to the flushing foam 62. Accordingly, considering only regarding the flushing foam 62, there is no need to clean the flushing tank 61 at this point of time. However, cleaning the flushing tank 61 by adding the cleaning liquid to the wiper tank 51 can reduce the consumption amount of the cleaning liquid than performing the cleaning of the wiper tank 51 and the cleaning of the flushing tank 61 separately. Accordingly, in accordance with a determination made by the controller 100 that the elapsed time T is not less than the first threshold value Th1 (step S104: YES), the controller 100 executes the adding-to-wiper tank and flushing tank-cleaning processing (step S120).

In a case that the elapsed time T is less than the first threshold value Th1, since a time until the flushing tank 61 is to be cleaned the next time is long, it is thus not possible to effectively prolong the time until the flushing tank 61 is to be cleaned the next time even if the cleaning of the flushing tank 61 is performed at a same time as the supplying of the cleaning liquid to the wiper tank 51. Meanwhile, regarding an effect of lowering the evaporation rate R of the wiper tank 51, adding of the cleaning liquid to the wiper tank 51 is less effective than the cleaning of the wiper tank 51. Thus, in a case that the cleaning liquid is added to the wiper tank 51, the time period until the wiper tank 51 is to be cleaned the next time becomes short, which in turn results in an increase in the consumption amount of the cleaning liquid. Accordingly, in accordance with the determination made by the controller 100 that the elapsed time T is less than the first threshold value Th1 (step S104: NO), the controller 100 performs the wiper tank-cleaning processing (step S110).

As described above, in a case that the elapsed time T is not less than the first threshold value Th1, there is such a possibility that the cleaning liquid might be evaporated also from the flushing tank 61 and that the ink on the flushing foam 62 might be fixed to the flushing foam 62, and thus the controller 100 performs the adding-to-wiper tank and flushing tank-cleaning processing (step S120). On the other hand, in a case that the elapsed time T is less than the first threshold value Th1, since the ink on the flushing foam 62 has not been fixed to the flushing foam 62, the controller 100 performs the wiper tank-cleaning processing (step S110). With this, it is possible to reduce the amount of the cleaning liquid consumed in the wipe processing and the flushing processing. Similarly, also in a case that the elapsed time T is not less than the third threshold value Th3, since there is such a possibility that the ink on the flushing foam 62 might be fixed to the flushing foam 62 and the cleaning liquid has not evaporated from the wiper tank 51 in a large amount. Accordingly, the controller 100 performs the flushing tank-cleaning processing (step S130), thereby making it possible to reduce the amount of the cleaning liquid consumed in the wipe processing and the flushing processing.

Effects of Embodiment

As indicated above, the printer 10 according to the present embodiment is provided with the head 42, the maintenance unit 50 and the controller 100. The maintenance unit 50 is provided with the wiper tank 51, the wipers 53 and 54, the flushing foam 62, the flushing tank 61, the supply pump 82 configured to supply the cleaning liquid to the wiper tank 51 and the discharge pump 85 configured to discharge (drain) the cleaning liquid from the wiper tank 51 and the flushing tank 61. The cleaning liquid is supplied to the flushing tank 61 via the wiper tank 51. In a case that the controller 100 executes the cleaning liquid supplying processing (in a case that the controller 100 supplies the cleaning liquid to the wiper tank 51), the controller 100 performs the processing of cleaning the wiper tank 51 (step S110), in accordance with the determination made by the controller 100 that the elapsed time T elapsed since the first flushing processing performed first after the flushing tank 61 has been cleaned is less than the first threshold value Th1 (step S104: NO); whereas the controller 100 performs the processing of cleaning the flushing tank 61 by adding the cleaning liquid to the wiper tank 51 (step S120), in accordance with the determination made by the controller 100 that the elapsed time T is not less than the first threshold value Th1 (step S104: YES).

According to the printer 10 of the present embodiment, in a case that the cleaning liquid is to be supplied to the cleaning tank 51 and that the time until the cleaning liquid is to be supplied to the flushing tank 61 the next time is short, the adding of the cleaning liquid having the effect of suppressing the ink from being fixed to the flushing foam 62 in addition to the effect of lowering the evaporation rate of the cleaning liquid stored in the wiper tank 51 is performed, thereby making it possible to reduce the amount of the cleaning liquid consumed in the wipe processing and the flushing processing.

Further, the wiper tank 51 and the flushing tank 61 are adjacent to each other; the printer 10 is further provided with the partition 61*e* configured to partition the wiper tank 51 and the flushing tank 61 from each other; and the cleaning liquid overflown from the wiper tank 51 is supplied to the flushing tank 61 over (across) the partition 61*e*. Accordingly, it is possible to supply the cleaning liquid to the flushing tank 61 via the wiper tank 51.

Further, the controller 100 performs, as step S110, the processing of controlling the discharge pump 85 so as to discharge the cleaning liquid from the wiper tank 51 (step S112), and of controlling the supply pump 82 so as to supply, to the wiper tank 51, the cleaning liquid of the first amount V1 being not less than the capacity of the wiper tank 51 (step S114); the controller performs, as step S120, the processing of controlling the discharge pump 85 so as to discharge the cleaning liquid from the flushing tank 61 (step S122), and of controlling the supply pump 82 so as to supply, to the wiper tank 51, the cleaning liquid of the second amount V2 with which the cleaning liquid is overflown from the wiper tank 51, thereby supplying the cleaning liquid to the flushing tank 61 (steps S124 and S126). Accordingly, by discharging the cleaning liquid from the wiper tank 51 and by supplying the cleaning liquid to the wiper tank 51 in step S110, it is possible to exchange the cleaning liquid stored in the wiper tank 51 and to clean the wiper tank 51. Furthermore, in step S120, by discharging (draining) the cleaning liquid from the flushing tank 61 and by causing the cleaning liquid to overflow from the wiper tank 51, it is possible to clean the flushing tank 61 by adding the cleaning liquid to the wiper tank 51.

Moreover, the second amount V2 is not less than the sum of the vacant capacity Q of the wiper tank 51 and the amount of the cleaning liquid to be supplied to the flushing tank 61. Accordingly, in step S120, it is possible to supply the cleaning liquid of the desired amount to the flushing tank 61 via the wiper tank 51.

Further, in accordance with the determination made by the controller 100 that the evaporation rate R of the cleaning liquid L stored in the wiper tank 51 is not less than the second threshold value Th2 (step S103: YES), the controller 100 performs either one of step S110 and step S120, based on the elapsed time T. In accordance with the determination made by the controller 100 that the evaporation rate R is less than the second threshold value Th2 (step S103: NO), the controller 100 performs the processing of supplying the cleaning liquid to the flushing liquid 61 (steps S134, S136) by controlling the discharge pump 85 in step S130 so as to discharge (drain) the cleaning liquid from the flushing tank 61 (step S132) and by controlling the supply pump 82 so as to supply the cleaning liquid of the third amount V3 to the wiper tank 51, the third amount V3 being an amount with which the cleaning liquid is overflown from the wiper tank 51 and which is not more than the second amount V2. The third amount V3 is the sum of the vacant capacity Q of the wiper tank 51 and the amount of the cleaning liquid (to be) supplied to the flushing tank 61. Accordingly, in the case that the evaporation rate R of the cleaning liquid L is less than the predetermined value, it is possible to clean the flushing tank 61 with the cleaning liquid of a smaller amount.

The controller 100 performs step S130 in accordance with the determination made by the controller 100 that the evaporation rate R is less than the second threshold value Th2 (step S103: NO) and in accordance with the determination made by the controller 100 that the elapsed time T is not less than the third threshold value Th3 (step S105: YES). The third threshold value Th3 is greater than the first threshold value Th1. In a case that the evaporation rate R of the cleaning liquid L is small and that the elapsed time elapsed since the cleaning of the flushing tank 61 is long, it is considered that the cleaning liquid is evaporated also from the flushing tank 61. Accordingly, in this case, by performing the processing of cleaning the flushing tank 61, rather than performing the processing of supplying the cleaning liquid in order to lower the evaporation rate R of the wiper tank 51, it is possible to reduce the amount of the cleaning liquid consumed in the wipe processing and the flushing processing, than in the case of performing the processing of supplying the cleaning liquid in order to lower the evaporation rate R of the wiper tank 51.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

With respect to the printer 10 according to the present embodiment, a variety of kinds of modification can be configured. In the printer 10, the wiper tank 51 and the flushing tank 61 are configured to be integrally formed. In an image recording apparatus according to a modification, the wiper tank 51 and the flushing tank 61 may be formed separately or individually. In the printer 10, the wiper unit 52 is configured to have the two wipers 53 and 54. In an image recording apparatus according to a modification, the wiper unit may have only one wiper. The printer 10 is configured so that the wiper tank 51 and the flushing tank 61 are adjacent to each other, and that the cleaning liquid overflown from the wiper tank 51 is supplied to the flushing tank 61 over the partition 61*e*. In an image recording apparatus according to a modification, a wiper tank and a flushing tank may be positioned to be apart from each other, the wiper tank and the flushing tank may be connected to each other via a tube, and the cleaning liquid may be supplied to the flushing tank from the wiper tank via the tube.

In the printer 10, the third threshold value Th3 in step S105 is greater than the first threshold value Th1 in step S104. In an image recording apparatus according to a modification, the third threshold value Th3 may be not more than the first threshold value Th1. The printer 10 is configured so that the supply pump 82 supplies the cleaning liquid to the wiper tank 51 and that the cleaning liquid is supplied to the flushing tank 61 via the wiper tank 51. In an image recording apparatus according to a modification, a supply pump may supply the cleaning liquid to the flushing tank and the cleaning liquid may be supplied to the wiper tank via the flushing tank. The first tank to which the cleaning liquid is supplied from the supply pump may be one of the wiper tank and the flushing tank, and the second tank to which the cleaning liquid is supplied via the first tank may be the other of (remaining one of) the wiper tank and the flushing tank. The printer 10 is configured as a carriage type printer provided with the carriage 41 which is movable and which has the head 42 mounted thereon. An image recording apparatus according to a modification may be a printer of a line head system which is not provided with a carriage and in which the position of the head is fixed. In this image recording apparatus, in a case that the maintenance of the head is performed, for example, a maintenance unit is moved to a position facing the nozzle surface of the head.

In the cleaning liquid supplying processing (FIG. 8) of the above embodiment, the flushing tank-cleaning processing S130 may be performed instead of the adding-to-wiper tank and flushing tank-cleaning processing S120, in a case that the evaporation rate R is not less than the second threshold value Th2 (S103: YES) and the elapsed time T is not less that the first threshold value Th1 (S104: YES). Even in such a case, the evaporation rate R of the wiper tank 51 is reduced and the cleaning liquid is added to the flushing tank 61. The flushing tank-cleaning processing S130 is another example of a second processing.

The invention claimed is:

1. An image recording apparatus comprising:

a head having a nozzle configured to eject a liquid;

a maintenance unit configured to perform maintenance of the head; and a controller, wherein the maintenance unit includes:

a wiper tank of which upper part is opened and which is configured to store a cleaning liquid;

a wiper configured to move to a first position at which the wiper is configured to make contact with a nozzle surface of the head and to a second position at which the wiper is immersed in the cleaning liquid stored in the wiper tank;

a flushing foam configured to absorb the liquid ejected from the nozzle;

a flushing tank of which upper part is opened and which is configured to accommodate the flushing foam;

a supply pump configured to supply the cleaning liquid to a first tank being one of the wiper tank and the flushing tank; and a discharge pump configured to discharge the cleaning liquid from the wiper tank and the flushing tank, the maintenance unit is configured such that the cleaning liquid is supplied, via the first tank, to a second tank being remaining one of the wiper tank and the flushing tank; and in a case that the controller supplies the cleaning liquid to the first tank, the controller is configured to perform a first processing of cleaning the first tank, under a condition that an elapsed time is less than a first threshold value, the elapsed time being a time elapsed since cleaning of the second tank or since a first predetermined processing regarding the second tank performed first after the cleaning of the second tank, and the controller is configured to perform a second processing of cleaning the second tank by adding the cleaning liquid to the first tank, under a condition that the elapsed time is not less than the first threshold value.

2. The image recording apparatus according to claim 1, wherein:

the first tank is the wiper tank;

the second tank is the flushing tank;

the elapsed time is a time elapsed since a first flushing processing performed first after cleaning of the flushing tank;

the first processing is a processing of cleaning the wiper tank; and the second processing is a processing of cleaning the flushing tank by adding the cleaning liquid to the wiper tank.

3. The image recording apparatus according to claim 1, wherein the wiper tank and the flushing tank are adjacent to each other;

the maintenance unit further includes a partition partitioning the wiper tank and the flushing tank from each other; and the maintenance unit is configured such that the cleaning liquid overflown from the first tank is supplied to the second tank over the partition.

4. The image recording apparatus according to claim 1, wherein the controller is configured to perform, as the first processing, a processing of controlling the discharge pump to discharge the cleaning liquid from the first tank and of controlling the supply pump to supply the cleaning liquid of a first amount to the first tank, the first amount being not less than a capacity of the first tank; and the controller is configured to perform, as the second processing, a processing of controlling the discharge pump to discharge the cleaning liquid from the second tank and of supplying the cleaning liquid to the second tank by controlling the supply pump to supply the cleaning liquid of a second amount to the first tank, the second amount being an amount with which the cleaning liquid overflows from the first tank.

5. The image recording apparatus according to claim 4, wherein the second amount is not less than a sum of a vacant capacity of the first tank and an amount of the cleaning liquid to be supplied to the second tank.

6. The image recording apparatus according to claim 4, wherein under a condition that an evaporation rate of the cleaning liquid stored in the first tank is not less than a second threshold value, the controller is configured to perform the first processing or the second processing based on the elapsed time; and under a condition that the evaporation rate is less than the second threshold value, the controller is configured to perform a third processing of controlling the discharge pump to discharge the cleaning liquid from the second tank and of supplying the cleaning liquid to the second tank by controlling the supply pump to supply the cleaning liquid of a third amount to the first tank, the third amount being an amount with which the cleaning liquid overflows from the first tank and which is not more than the second amount.

7. The image recording apparatus according to claim 6, wherein the third amount is a sum of a vacant capacity of the first tank and an amount of the cleaning liquid to be supplied to the second tank.

8. The image recording apparatus according to claim 6, wherein under a condition that the evaporation rate is less than the second threshold value and that the elapsed time is not less than a third threshold value, the controller is configured to perform the third processing.

9. The image recording apparatus according to claim 8, wherein the third threshold value is greater than the first threshold value.

10. A method of controlling an image recording apparatus, the recording apparatus including: a head having a nozzle configured to eject a liquid; and a maintenance unit configured to perform maintenance of the head, the maintenance unit including: a wiper tank of which upper part is opened and which is configured to store a cleaning liquid; a wiper configured to move to a first position at which the wiper is capable of making contact with a nozzle surface of the head and to a second position at which the wiper is immersed in the cleaning liquid stored in the wiper tank; a flushing foam configured to absorb the liquid ejected from the nozzle; a flushing tank of which upper part is opened and which is configured to accommodate the flushing foam; a supply pump configured to supply the cleaning liquid to a first tank being one of the wiper tank and the flushing tank; and a discharge pump configured to discharge the cleaning liquid from the wiper tank and the flushing tank, the maintenance unit being configured such that the cleaning liquid is supplied, via the first tank, to a second tank being remaining one of the wiper tank and the flushing tank, the method comprising:

cleaning the first tank, in a case of supplying the cleaning liquid to the first tank, under a condition that an elapsed time is less than a first threshold value, the elapsed time being a time elapsed since cleaning of the second tank or since a first predetermined processing regarding the second tank performed first after the cleaning of the second tank; and cleaning the second tank by adding the cleaning liquid to the first tank, in the case of supplying the cleaning liquid to the first tank, under a condition that the elapsed time is not less than the first threshold value.

* * * * *